(12) United States Patent
Ikubo

(10) Patent No.: US 8,548,204 B2
(45) Date of Patent: Oct. 1, 2013

(54) IMAGE PROCESSING DEVICE, METHOD FOR PROCESSING IMAGE, AND PROGRAM FOR PROCESSING IMAGE

(75) Inventor: Tatsuki Ikubo, Shizuoka (JP)

(73) Assignee: NEC Access Technica, Ltd., Shizuoka (JP)

(*) Notice: Subject to any disclaimer, the term of this patent is extended or adjusted under 35 U.S.C. 154(b) by 111 days.

(21) Appl. No.: 13/312,402

(22) Filed: Dec. 6, 2011

(65) Prior Publication Data
US 2012/0148114 A1    Jun. 14, 2012

(30) Foreign Application Priority Data
Dec. 14, 2010   (JP) .................................. 278543/2010

(51) Int. Cl.
*G06K 9/00*    (2006.01)

(52) U.S. Cl.
USPC ........... 382/112; 358/498; 358/453; 358/474; 358/247

(58) Field of Classification Search
USPC .................. 382/112; 358/247, 453, 474, 498
See application file for complete search history.

(56) References Cited

U.S. PATENT DOCUMENTS

| | | | | |
|---|---|---|---|---|
| 2005/0280867 A1* | 12/2005 | Arai | ................................ | 358/2.1 |
| 2006/0170990 A1* | 8/2006 | Ishido et al. | .................. | 358/498 |
| 2007/0097443 A1* | 5/2007 | Ishiguro et al. | .............. | 358/3.26 |
| 2007/0109603 A1* | 5/2007 | Sakai | ........................... | 358/3.13 |
| 2009/0244657 A1* | 10/2009 | Arima | ........................... | 358/483 |
| 2010/0053351 A1* | 3/2010 | Lukac | ....................... | 348/222.1 |

FOREIGN PATENT DOCUMENTS

| JP | 2004228654 A | | 8/2004 |
|---|---|---|---|
| JP | 2006101295 | * | 4/2006 |
| JP | 2006101295 A | | 4/2006 |
| JP | 2006197484 A | | 7/2006 |
| JP | 2007267078 A | | 10/2007 |
| JP | 2008099129 | * | 4/2008 |
| JP | 2008099129 A | | 4/2008 |
| JP | 2009134517 A | | 6/2009 |
| JP | 2009267975 A | | 11/2009 |

OTHER PUBLICATIONS

Japanese Office Action for JP2010-278543 mailed on Oct. 30, 2012.

* cited by examiner

*Primary Examiner* — Stephen R Koziol
*Assistant Examiner* — Shaghayegh Azima

(57) ABSTRACT

An image processing device is comprising: an input unit which inputs image data of a chart; and a streak detection processing unit which specifies an inspection region in the inputted image data, calculates a line average which is an average of all pixels on a line, for each line in a sub-scanning direction in the inspection region, calculates a width average value which is an average of the line averages of the lines corresponding to a series of main scanning pixels, the number of which is a specified width and whose center is a target pixel, for each target pixel, calculates a difference between the width average value, and the average of the line averages of the target pixel and a predetermined number of main scanning pixels, and determines that the target pixel is included in a streak when the difference exceeds the threshold value set in advance.

7 Claims, 18 Drawing Sheets

IMAGE PROCESSING DEVICE, METHOD FOR PROCESSING IMAGE, AND PROGRAM FOR PROCESSING IMAGE

This application is based upon and claims the benefit of priority from Japanese Patent Application No. 2010-278543, filed on Dec. 14, 2010, the disclosure of which is incorporated herein in its entirety by reference.

TECHNICAL FIELD

The present invention relates to an image processing device, a method for processing an image, and a program for processing an image.

BACKGROUND ART

A book scanner (BS) type image reading device and an auto document feeder (ADF) type image reading device are known as an image reading device mounted on a digital multifunction device. In the BS type image reading device, an original document placed on a glass is read by a scanning carriage with reading means. In the ADF type image reading device, the carriage is fixed and an original document is fed to read it.

When an original document is read by the ADF type image reading device, there is a possibility that, on the way of feeding the original document, foreign matter such as dust, paper powder, or the like which adheres to the original document is conveyed to a contact glass for ADF and the foreign matter adheres to the contact glass for ADF. When an original document is read in this state, there is a possibility that the read data includes the image of the foreign matter, and, as a result, a streak in a sub-scanning direction appears in the image and the quality of the image lowers. In both types of image reading devices, when foreign matter adheres to a mirror on an optical path of reading, there is a possibility that a streak in the sub-scanning direction appears like the above-mentioned case. If a streak appears when a user operates an image reading device, the user can remove the foreign matter if the foreign matter that generates the streak adheres to the contact glass. However, in case that foreign matter adheres to a mirror on the optical path, it is very difficult for the user to remove the foreign matter. Therefore, the user has to consume a maintenance service to remove the foreign matter. Accordingly, an inspection is performed before shipment. If a streak is detected, a cleaning is usually performed to remove foreign matter.

As a method for detecting a streak, the following methods are known for the ADF type image reading device. Reading means read data of a background plate through the contact glass for ADF in a state in which no foreign matter exists, and store the read data in a RAM (Random Access Memory). The reading means read data of the background plate before reading an arbitrarily original document, and by comparing the read data with the data stored in the RAM, detect a factor, such as the foreign matter on a stand glass or a mirror or the like, which generates a streak (refer to for example, patent document 1). Additionally, a method, which includes reading image data of an arbitrary original document by the ADF type reading means, finding the data which is not background data and is keeping up in the sub-scanning direction from the read image data, and detecting the data as the streak, is known (refer to for example, patent document 2). Further, as another method, a method, which includes reading a chart for inspection on which two stripes colored in black and gray, each of which has a constant gray level, are printed, transferring the read data to a personal computer (PC), and detecting the streak that appears on the stripes by an inspection program, is known (refer to for example, patent document 3).

PRECEDING TECHNICAL LITERATURE

Patent Document

[Patent document 1] Japanese Patent Application Laid-Open No. 2004-228654
[Patent document 2] Japanese Patent Application Laid-Open No. 2006-197484
[Patent document 3] Japanese Patent Application Laid-Open No. 2007-267078

SUMMARY

An object of the present invention is to provide an image processing device, an image processing method an image, and an image processing program in which consistency can be obtained between the result of the streak detection from the read data and the streak that is visually observed in the output image of the read data.

The methods described in the patent document 1, the patent document 2, and the patent document 3 have the same problem in which there is a possibility that there is inconsistency between an output image outputted by printing the read data of the original document and a result of streak detection from the read data by each method. The state in which inconsistency exists includes a state in which the streak cannot be visually observed in the output image of the read data even though the result of the detection from the read data is that there is a streak on the output image, and vice versa. It is not desirable that there is inconsistency between the result of the streak detection in data and a streak that is visually observed in the image which is the output of the data. The reason for this inconsistency is that, in the streak detecting methods described in the three patent documents, a streak is detected only by a difference between the pixel value in a streak portion and the pixel value in a surrounding area of the streak portion, and the width of the a streak is not considered. Usually, a streak in the output image can be easily observed by a human's eye when the difference in pixel value between the streak portion and the surrounding area of the streak portion is large and the width of the streak is large, and, in contrast, the streak cannot be easily observed by the human's eye when the difference in pixel value between them is small and the width of the streak is small. However, there is a case in which even when a streak has a width of a plurality of pixels, the streak cannot be visually observed if the difference in pixel value is small. On the contrary, there is a case in which even when a streak has a width of one pixel, the streak can be visually observed if the difference in pixel value is large. Additionally, there is a case in which when the difference in pixel value between a portion of a streak and the surrounding area of the portion of the streak is small, the streak cannot be visually observed if the streak has a width of one pixel, but the streak can be visually observed if the streak has a width of a plurality of pixels. Therefore, in order to detect a streak, the width of the streak has to be taken into consideration simultaneously with the difference in the pixel value between the streak portion and the surrounding area of the streak portion. However, in the three patent documents described above, only the difference in the pixel value between them is considered. Therefore, there is an inconsistency between the result of the streak detection from the read data and the streak that is visually observed in the output image of the read data.

In the detecting method described in the patent document 1, the data obtained by reading the background plate through the contact glass for ADF in a state in which no foreign matter exists is stored in the RAM. In the detecting method described in the patent document 1, by reading the data of the background plate before reading data of an arbitrary original document by the ADF type reading means, and by comparing the read data of the background plate with the data stored in the RAM, the foreign matter that generates the streak is detected. In this method, for each main scanning pixel, when difference to between the read data and the data stored in the RAM at the same position is equal to or more than a threshold value, it is determined that the foreign matter exists. In this method, the comparison is performed one by one for each pixel of each main scanning line. Therefore, the width is not considered. It is possible that a streak, which has the difference less than the threshold and cannot is be visually observed if the streak has a width of one pixel, can be visually observed if the streak has a width of a plurality of pixels. Therefore, by detecting a streak from read data with comparing pixels one by one, a detection result which is consistent with a streak which is visually observed in the output image of the read data cannot always be obtained.

The detecting method described in the patent document 2 includes reading the arbitrary original document the ADF type reading means, finding data which is not background data and keeping up in the sub-scanning direction from the image data, and detecting the data as a streak. In this method, each pixel of each main scanning line is selected as a target pixel, and the target pixel is detected as a candidate for a streak pixel if the difference between the pixel value of the target pixel and the pixel value of the pixels at left and right sides of the target pixel is equal to or more than a threshold value. This process is performed in the sub-scanning direction. If the number of pixels which is detected as a candidate for a streak pixel at the same main scanning position in the sub-scanning direction is more than a predetermined value, it is determined that a streak exists at the main scanning position. However, in the detecting method described in the patent document 2, the streak detection is performed one by one on each pixel of each main scanning line using the difference of pixel value. Therefore, by the method described in the patent document 2, a detection result which is consistent with a streak that is visually observed on the output image of the read data cannot be obtained from the read data, in the same way by the detection method described in the patent document 1.

The detecting method described in the patent document 3 includes reading a chart on which two stripes colored in black and gray, each of which has a constant gray level, are printed, transferring the read data to a personal computer, and detecting a streak that appears on the stripes by an inspection program. The method of detecting a streak that appears on the stripes used in the inspection program includes calculating an average value of data of each line on the stripes in the sub-scanning direction first, and obtaining a series of the average values, the number of which is the length of the main scanning line. The inspection program selects each value of the series of the average values each which is related to a line in the sub-scanning direction as a target value, and calculates the average value of subsequent 8 values after the target value in the series of the average values, and determines that the line related to the target value is a streak, if the difference between the target value and the average value of the subsequent 8 values is equal to or more than a threshold value. In the detecting method described in the patent document 3, the determination is performed one by one on each line in the sub-scanning direction. Therefore, by the detecting method described in the patent document 3, a detection result which is consistent with the streak visually observed on the output image of the read data cannot always be obtained from the read data.

Further, the detecting methods described in the patent document 1, the patent document 2, and the patent document 3 have problems of accuracy of detection.

In the detecting method described in the patent document 1, foreign matter that is a cause of a streak is detected by using data obtained by reading a background plate through a contact glass for ADF instead of using a chart. By this method, even when no foreign matter exist on the contact glass for ADF or a mirror on the optical path of reading, foreign matter is detected if foreign matter adheres to the background plate. When a shading correction is performed, a white reference plate other than the background plate is used. Therefore, the foreign matter on the background plate does not generate a streak on the output image. In other words, by the detecting method described in the patent document 1, the foreign matter on the background plate which does not generate the streak is detected.

In the method described in the patent document 2, a streak is detected by using an arbitrary original document instead of a chart for streak inspection. In the method described in the patent document 2, each pixel of a main scanning line of read data is selected as a target pixel, and when the difference between the pixel value of the target pixel and the pixel value of the pixels at left and right sides of the target pixel is equal to or more than a threshold value, the target pixel is determined to be a candidate for a streak pixel. This process is performed in the sub-scanning direction, and when the number of pixels that is determined to be a candidate for a streak pixel at the same main scanning position in the sub-scanning direction is equal to or more than a predetermined value, it is determined that a streak exists at the main scanning position. In other words, the method described in the patent document 2 is a method in which nothing but a line whose width is constant and which extends in a straight line is determined to be a streak. However, various vertical lines such as a character, a frame border, and the like may be drawn on an arbitrary original document. For example, when a square frame border is drawn on an original document, a vertical line intersects with two horizontal lines. Therefore, there is a possibility that it is determined that a vertical line intersecting with a border line is not a streak even if the vertical line is a streak because of the part where the vertical line intersects with the border. And, when a character is written on the original document, there is a possibility that it is determined that a vertical line intersecting with a character is not a streak even if the vertical line is a streak because of an intersection or a round part that the character includes. On the contrary, when a straight vertical line is drawn on the original document intentionally, there is a possibility that it is determined that the vertical line is a streak. And if, among pixels which are located at a main scanning position where almost all the pixels are determined to be candidates for streak pixels, there exists even one pixel which is not determined to be a candidate for a streak pixel because of random noise generated while reading an original document, it is determined that all the candidates for steak pixels at the main scanning position are not streak pixels. Accordingly, this detecting method is easily affected by random noise.

In the detecting method described in the patent document 3, a region for streak inspection is specified in read data of a chart, a threshold value is provided to a difference between an average value of a target line in sub-scanning direction and the average value of the subsequent 8 lines after the target line, determination is performed one by one for each of the target lines which is the lines of the specified region for streak inspection in sub-scanning direction. Accordingly, in the detecting method described in the patent document 3, when a target line and the subsequent 8 lines after the target line are included in a streak, even if a target line is included in a streak, it is determined that the target line is not included in a streak because there is no difference between the average value of the target line and the average value of the subsequent 8 lines after the target line. In other words, when a width of a to streak is 9 lines or more than 9 lines, the detecting method described in the patent document 3 detects at most 8 lines from a border of a streak area as a part of a streak and cannot detect a position of a streak accurately. Further, in the detecting method described in patent document 3, even if a target line is not included in a streak, when a streak is included in the subsequent 8 lines after the target line, there is a possibility that it is determined that the target line is included in a streak by the difference between the average values and the threshold value.

Means for Solving the Problems

An image processing device is comprising: an input unit which inputs image data of a chart for inspection; and a streak detection processing unit which specifies an inspection region in the image data inputted by the input unit, calculates a line average value which is an average value of all pixels on a line, which corresponds to a main scanning pixel, for each line in a sub-scanning direction in the inspection region, calculates a width average value which is an average value of the line averages of the lines corresponding to a series of main scanning pixels, the number of which is a specified width and whose center is a target pixel, for each target pixel which is a main scanning pixel selected sequentially in a inspection direction from the first main scanning pixel to the last main scanning pixel, calculates a difference between the width average value, and the average value of the line average values of the target pixel and a predetermined number of main scanning pixels which are the nearest to the target pixel located at a backward side of the target pixel with respect to the inspection direction, and determines that the target pixel is included in a streak when the difference exceeds the threshold value set in advance.

An image processing method is comprising: inputting image data of a chart for inspection; specifying an inspection region in the image data; calculating a line average value which is an average value of all pixels on a line, which corresponds to a main scanning pixel, for each line in a sub-scanning direction in the inspection region; calculating a width average value which is an average value of the line averages of the lines corresponding to a series of main scanning pixels, the number of which is a specified width and whose center is a target pixel, for each target pixel which is a main scanning pixel selected sequentially in a inspection direction from the first main scanning pixel to the last main scanning pixel; calculating a difference between the width average value, and the average value of the line average values of the target pixel and a predetermined number of main scanning pixels which are the nearest to the target pixel located at a backward side of the target pixel with respect to the inspection direction; and determining that the target pixel is included in a streak when the difference exceeds a threshold value set in advance.

A non-transitory computer readable medium embodying an image processing program which causes a computer to execute a process is comprising: inputting image data of a chart for inspection; specifying an inspection region in the image data; calculating a line average value which is an average value of all pixels on a line, which corresponds to a main scanning pixel, for each line in a sub-scanning direction in the inspection region; calculating a width average value which is an average value of the line averages of the lines corresponding to a series of main scanning pixels, the number of which is a specified width and whose center is a target pixel, for each target pixel which is a main scanning pixel selected sequentially in a inspection direction from the first main scanning pixel to the last main scanning pixel, calculating a difference between the width average value, and the average value of the line average values of the target pixel and a predetermined number of main scanning pixels which are the nearest to the target pixel located at a backward side of the target pixel with respect to the inspection direction; and determining that the target pixel is included in a streak when the difference exceeds a threshold value set in advance.

Advantage of the Invention

By using the present invention, a streak generated by foreign matter on a contact glass for ADF or an optical path of reading can be detected with accuracy where a result of streak detection from read data is consistent with a streak that is visually observed on the output image of the read data.

BRIEF DESCRIPTION OF THE DRAWINGS

Exemplary features and advantages of the present invention will become apparent from the following detailed description when taken with the accompanying drawings in which.

EXEMPLARY EMBODIMENT

Exemplary Embodiment 1

Figure 1:
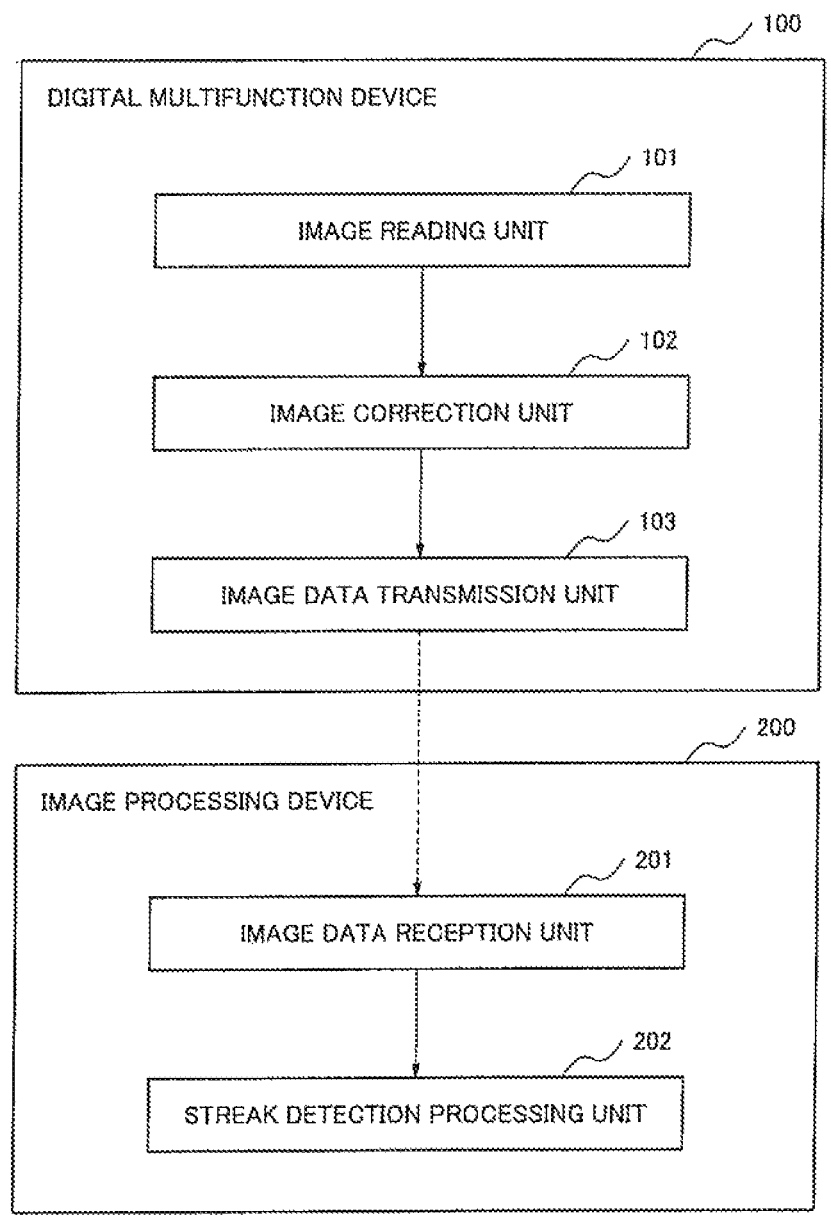
FIG. 1 is a block diagram showing an example of a configuration of a digital multifunction device and a first exemplary embodiment of an image processing device to which the present invention is applied.

A first exemplary embodiment of the present invention will be described below with reference to the drawing.

FIG. 1 is a block diagram showing an example of a configuration of a digital multifunction device and a first exemplary embodiment of an image processing device to which the present invention is applied.

A digital multifunction device 100 includes an image reading unit 101, an image correction unit 102, and an image data transmission unit 103.

An image processing device 200 includes an image data reception unit 201 and a streak detection processing unit 202. The image processing device 200 is realized by a personal computer or the like. The image processing device 200 is connected to a monitor 210 which displays image data. Further, the monitor 210 may be included in the image processing device 200.

Figure 2:
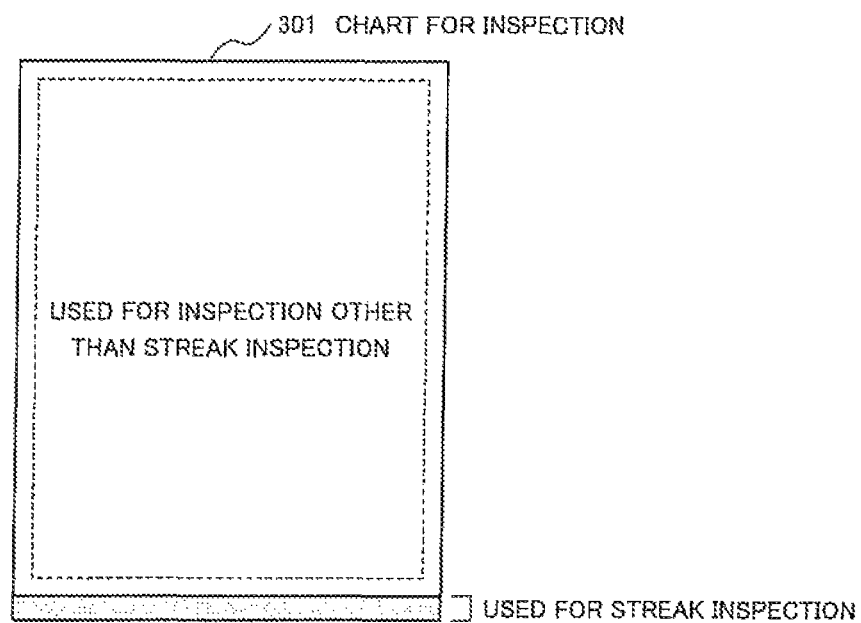
FIG. 2 is an explanation drawing showing an example of a chart used for a streak inspection.

The image reading unit 101 reads a chart shown in FIG. 2. As shown in FIG. 2, a gray band, which has a constant gray level and a width of about 300 lines and is used for streak inspection, is drawn on a chart for inspection 301. And, an area used for inspection other than streak inspection is included, because not only a streak inspection but also an inspection of resolution, an inspection of reproducibility of a character and the like is usually performed when image quality is inspected before shipment. By using the chart for inspection 301, a plurality of inspections including a streak inspection can be performed with single scan without changing the chart. The chart for inspection 301 shown in FIG. 2 is an example. And, the gray level and the position of the gray band can be arbitrarily changed.

If the digital multifunction device 100 includes the ADF, the image reading unit 101 reads the chart for inspection 301 that is set to the ADF. If the digital multifunction device 100 does not include the ADF, the image reading unit 101 reads the chart for inspection 301 that is set on a glass surface of the BS.

The image reading unit 101 reads the chart for inspection 301 and outputs data of the read image to the image correction unit 102.

The image correction unit 102 performs image processing, such as shading correction or the like, on the inputted image data and outputs the processed image data to the image data transmission unit 103.

The image data transmission unit 103 transfers the image data inputted from the image correction unit 102 to the image processing device 200.

The image data reception unit 201 receives the image data transmitted from the digital multifunction device 100 and outputs the received image data to the streak detection processing unit 202.

The streak detection processing unit 202 performs a streak detection process on the image data inputted from the image data reception unit 201. The streak detection processing unit 202 can be realized by a microcomputer or the like which operates according to a program.

Figure 3:
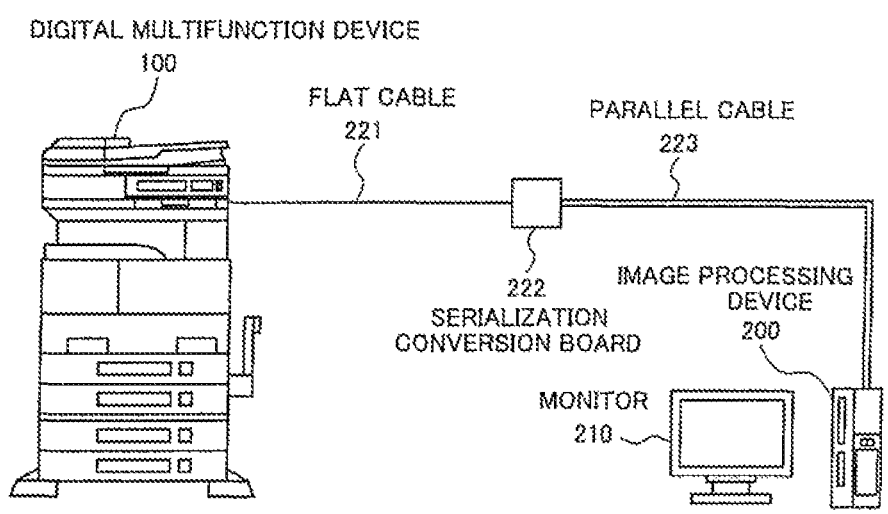
FIG. 3 is an explanation drawing showing an example of connection between a digital multifunction device and an image processing device to which the present invention is applied.

FIG. 3 is an explanation drawing showing an example of connection between the digital multifunction device and the image processing device to which the present invention is applied.

As shown in FIG. 3, the digital multifunction device 100 is connected to the image processing device 200 via a serial-parallel conversion (hereinafter, referred to as serialization) conversion board 222. Specifically, the digital multifunction device 100 is connected to the serialization conversion board 222 through a flat cable 221 and the serialization conversion board 222 is connected to the image processing device 200 through a parallel cable 223. The way of connection shown in FIG. 3 is an example, and another way of connection is acceptable, also.

The serialization conversion board 222 is a board which performs the serialization conversion in order to transfer the data processed by the image correction unit 102 of the digital multifunction device 100 to the image processing device 200.

Next, operation of this exemplary embodiment is described below.

The operation of the streak detection process by the streak detection processing unit 202 is described with reference to FIG. 4.

Figure 4:
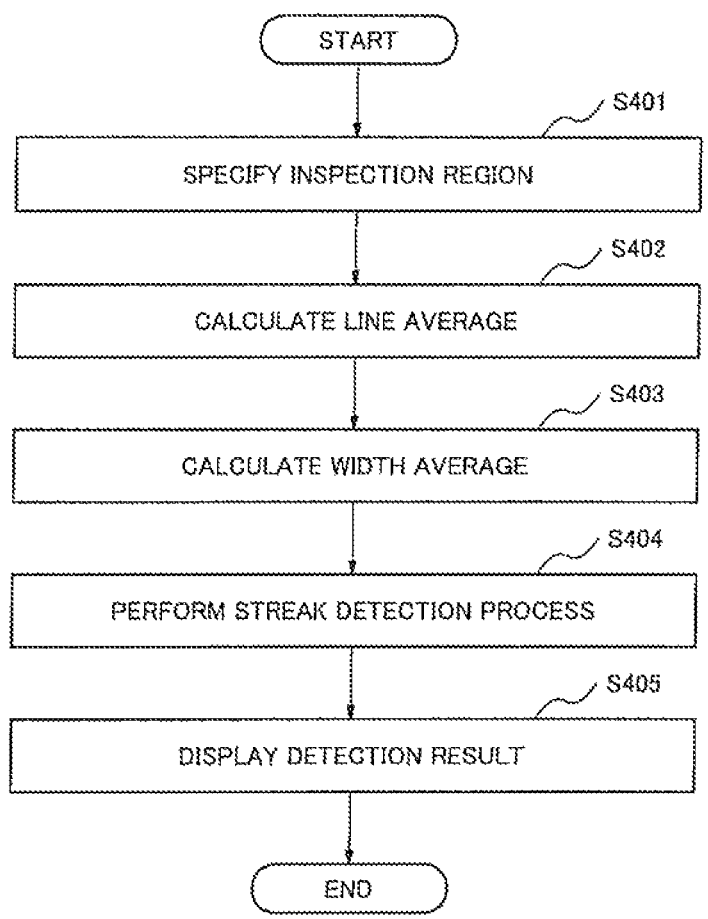
FIG. 4 is a flowchart showing operation of a streak detecting process of a streak detection processing unit 202 in a first exemplary embodiment.

FIG. 4 is a flowchart showing the operation of the streak detection process by the streak detection processing unit 202.

Figure 5:
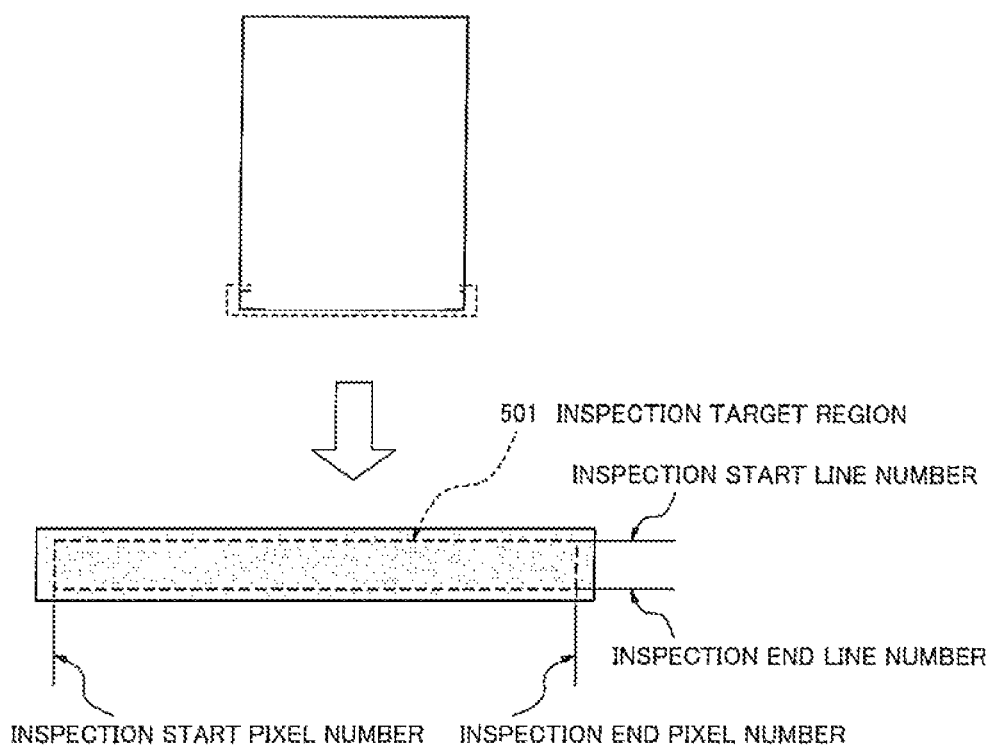
FIG. 5 is an explanation drawing showing an example of specifying an inspection region to a chart.

The streak detection processing unit 202 specifies four parameters, such as an inspection start pixel number, an inspection end pixel number, an inspection start line number, and an inspection end line number, which are shown in FIG. 5, and determines an inspection target region 501 in the image data inputted from the image data reception unit 201 (step S401). Each of four parameters can be set by a user of the image processing device 200 or the like.

Figure 6:
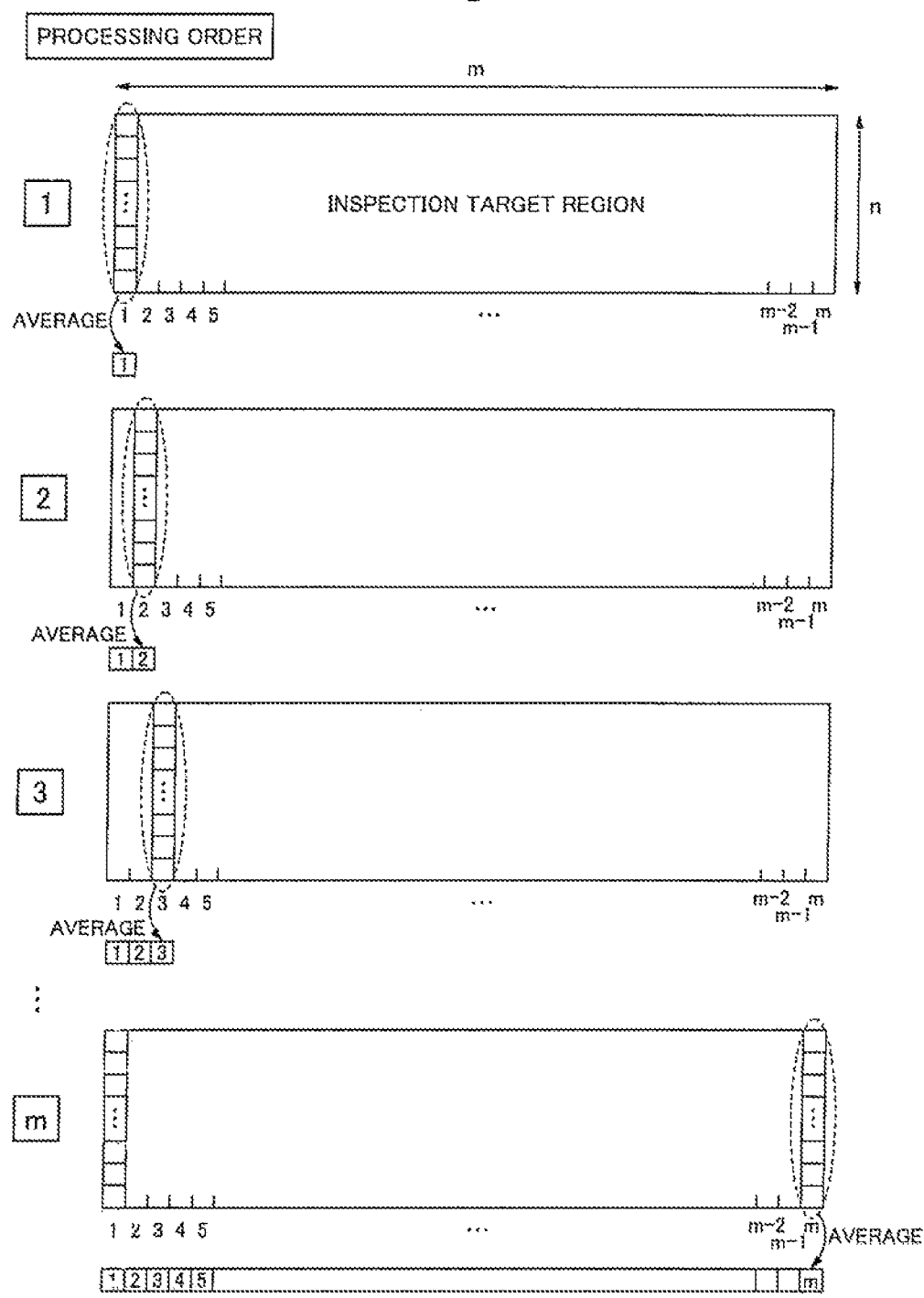
FIG. 6 is an explanation drawing showing an example of a process of calculating an average value for a line in an inspection region in which the number of main scanning pixels is m and the number of pixels included in one line in a sub-scanning direction is n.

As shown in FIG. 6, the streak detection processing unit 202 calculates an average (hereinafter, referred to as line average) of pixel values of pixels on a line the data of the main scanning pixels, in the inspection region determined in step S401, for each line in the sub-scanning direction. The number of lines in the sub-scanning direction is same as the number of pixels in main scanning direction. Hereafter, the line average values calculated in this calculation are referred to as line average values of main scanning pixels (also referred to as pixels in main scanning direction), which correspond to the lines in the sub-scanning direction, respectively. In this calculation, the streak detection processing unit 202 calculates the average for each RGB(red, green, blue) color and acquires three values of line average data for each line in the sub-scanning direction (step S402). FIG. 6 is an explanation drawing showing an example of a process of calculating the line averages in the inspection region in which m main scanning pixels and n pixels for each line in the sub-scanning direction are included.

Figure 7:
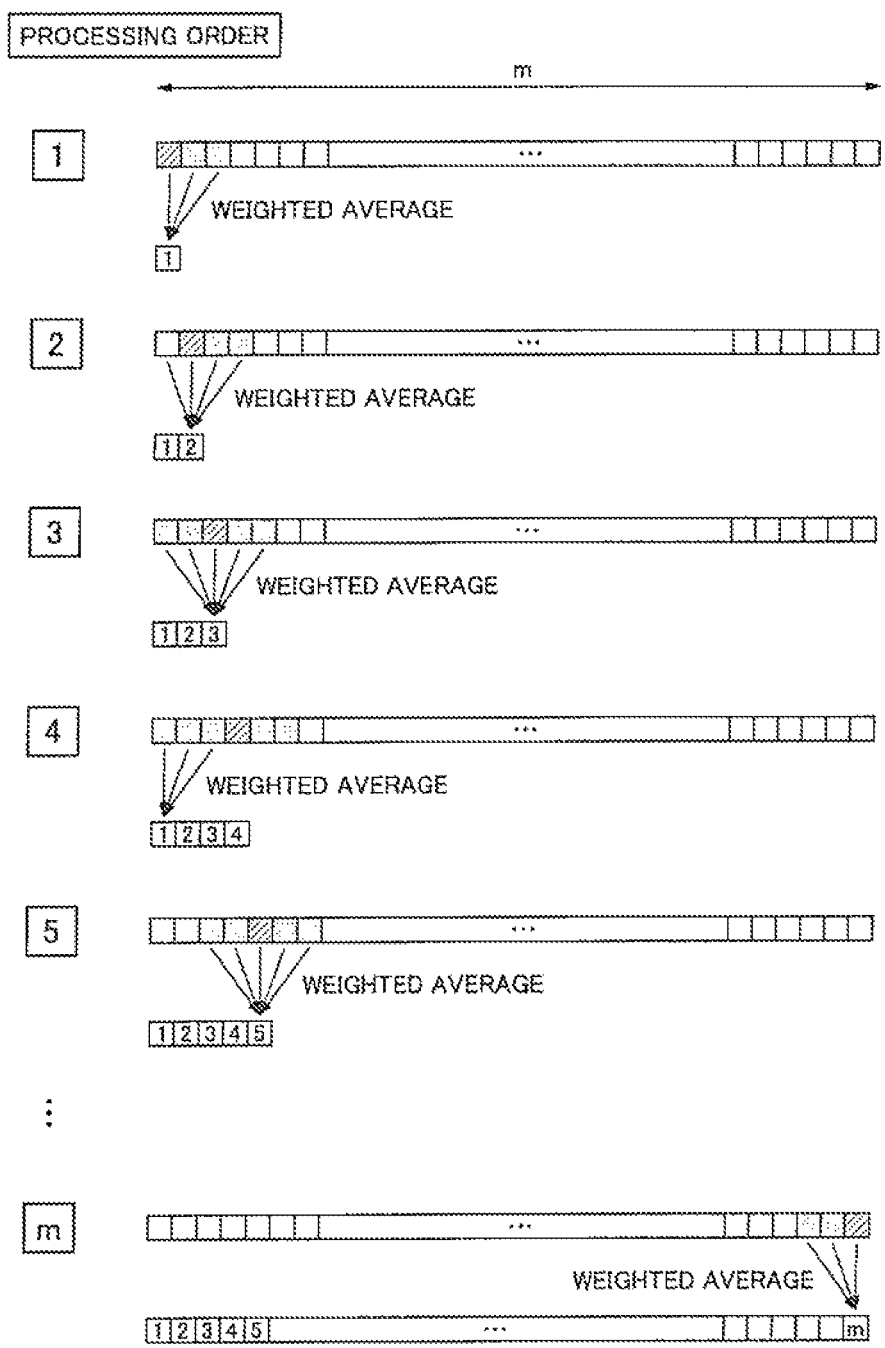
FIG. 7 is an explanation drawing showing an example of a process of a width average calculation in a first exemplary embodiment.
Figure 8:
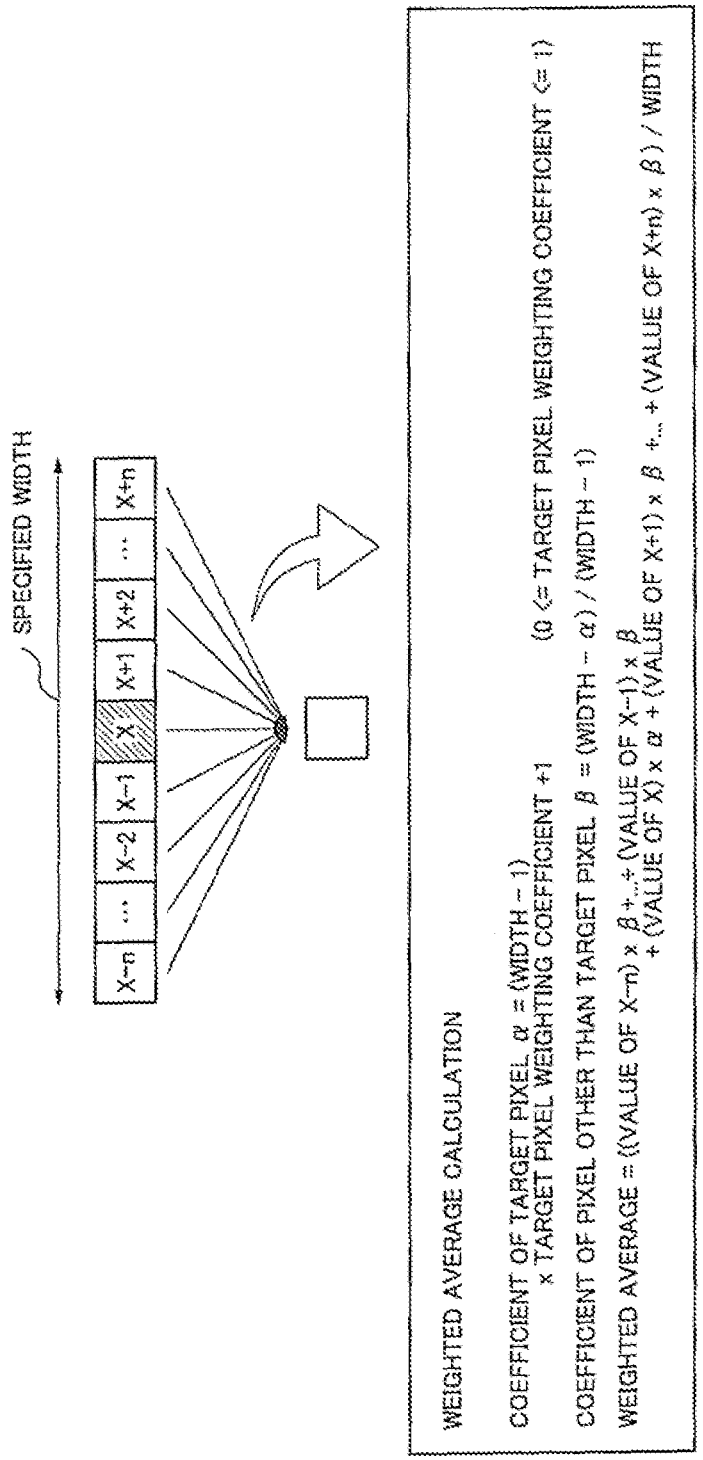
FIG. 8 is an explanation drawing showing an example of a process of a weighted average calculation in a specified width of pixels whose center is a target pixel.

As shown in FIG. 7, the streak detection processing unit 202 calculates, for each color, a weighted average value of the line average values, which are calculated in step S402, corresponding to a series of pixels whose center is a target pixel, for each target pixel which is selected from main scanning pixels in turn (step S403). The target pixel is a pixel that is a target of streak detection. The weighted average values are calculated using two parameters, such as a width (hereafter, referred to as a specified width), which is the number of pixels whose line average values are used for weighted average calculation, and a weighting coefficient of the target pixel (hereinafter, referred to as a target pixel weighting coefficient), which are shown in FIG. 8. The target pixel weighting coefficient is a fractional value from 0 to 1. In this exemplary embodiment, the target pixel weighting coefficient is two to the negative six. The specified width can be set by a user of the image processing device 200 or the like. And, the target pixel weighting coefficient can be set by a user of the image processing device 200 or the like. The accuracy of the streak detection can be changed by changing the target pixel weighting coefficient. In the case, such as the case of 1st processing order, the case of 2nd processing order, and the case of m-th processing order, which are shown in FIG. 7, when the number of pixels that are included in the object of calculation of the weighted average is less than the specified width, the streak detection processing unit 202 calculates the weighted average using the number of pixels that are included in the object of the calculation of the weighted average as a specified width.

Hereafter, a width average is an average of line average values corresponding to a series of pixels. The weighted average in this exemplary embodiment is a width average which is calculated using coefficients for weighting.

When the streak detection processing unit 202 calculates the weighted average value with respect to the specified width, the streak detection processing unit 202 calculates a coefficient for the target pixel $\alpha$ corresponding to the target pixel weighting coefficient in accordance with the following calculation formula.

In the following formula, $\alpha$ is a coefficient for the target pixel, $\beta$ is a coefficient for each of the pixels other than the target pixel, and "width" is the specified width.

Coefficient for target pixel $\alpha$=(width−1)×target pixel weighting coefficient+1  formula (1)

The coefficient for the pixels other than target pixel $\beta$ is calculated by the following calculation formula.

Coefficient for pixels other than target pixel $\beta$=(width−$\alpha$)/(width−1)  formula (2)

The streak detection processing unit 202 calculates the weighted average value with respect to the specified width using the coefficient for the target pixel $\alpha$ and the coefficient for the pixels other than the target pixel $\beta$. The weighted average value is calculated in accordance with the following calculation formula, where x is a value indicating a position of the target pixel and the width is 2n+1.

And, in the following formula, value of x is a value of the target pixel, value of x−i is a value of i-th pixel on the left side of the target pixel, and value of x+i is a value of i-th pixel on the right side of the target pixel, where i is a positive integer, as shown in FIG. 8.

Weighted average value=((value of $x-n$)×$\beta$+ . . . +(value of $x-1$)×$\beta$+(value of $x$)×$\alpha$+(value of $x+1$)×$\beta$+ . . . +(value of $x+n$)×$\beta$)/(2n+1)  formula (3)

Figure 9:
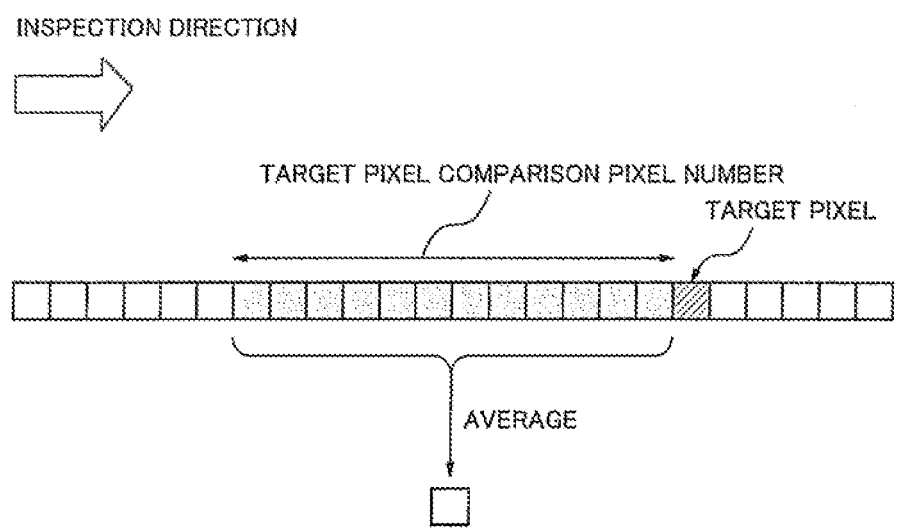
FIG. 9 is an explanation drawing showing an example of a relationship of a target pixel and a target pixel comparison pixel number.

As shown in FIG. 9, the streak detection processing unit 202 takes each of the main scanning pixels one by one as a target pixel, and calculates the average value (hereinafter, referred to as BASE value) of the weighted average values of the pixels of a predetermined number (hereafter, referred to as a target pixel comparison pixel number) located at the backward side of the target pixel with respect to the inspection direction, where the weighted average value data of each main scanning pixel is calculated for each RGB color in step S403. The backward side with respect to the inspection direction is the left side with respect to the main scanning direction when starting point of each main scanning is the left end and each main scanning is going on from left to right. The streak detection processing unit 202 calculates RDIF, GDIF, and BDIF, each of which is a difference between a component, which corresponds to a color among the RGB colors, of the weighted average value of the target pixel and the BASE value of the color, with respect to the following calculation formulas. The target pixel comparison pixel number can be set by a user of the image processing device 200 or the like.

In the following formula, R, G, and B of the target pixel is the R, G, and B component of the weighted average value of the target pixel, respectively.

$RDIF=((R$ of target pixel$)-($BASE value of $R))$  formula (4), $GDIF=((G$ of target pixel$)-($BASE value of $G))$  formula (5), $BDIF=((B$ of target pixel$)-($BASE value of $B))$  formula (6)

The streak detection processing unit 202 compares each value of the RDIF, the GDIF, and the BDIF with a threshold value for white streak detection and a threshold value for black streak detection for the corresponding color and determines whether or not the target pixel is included in a white streak and whether or not the target pixel is included in a black streak with respect to the following judgment formulas. The threshold values for white streak detection and the threshold value for black streak detection for each color can be set by a user of the image processing device 200 or the like.

$((RDIF>0)$ $\wedge$ $(RDIF>$threshold value for white streak detection for $R))$ $\vee$ $((GDIF>0)$
$\wedge$ $(GDIF>$threshold value for white streak detection for $G))$ $\vee$ $((BDIF>0)$
$\wedge$ $(BDIF>$threshold value for white streak detection for $B))$  formula (7)

$((RDIF<0)$ $\wedge$ $(-RDIF>$threshold value for black streak detection for $R))$ $\vee$ $((GDIF<0)$
$\wedge$ $(-GDIF>$threshold value for black streak detection for $G))$ $\vee$ $((-BDIF>0)$
$\wedge$ $(BDIF>$threshold value for black streak detection for $B))$  formula (8)

The streak detection processing unit 202 determines that the target pixel is included in a white streak if the formula (7) is true and the target pixel is included in a black streak if the formula (8) is true (step S404). Here, in the formula (7) and the formula (8), "$\wedge$" represents a logical product and "$\vee$" represents a logical sum.

Figure 10:
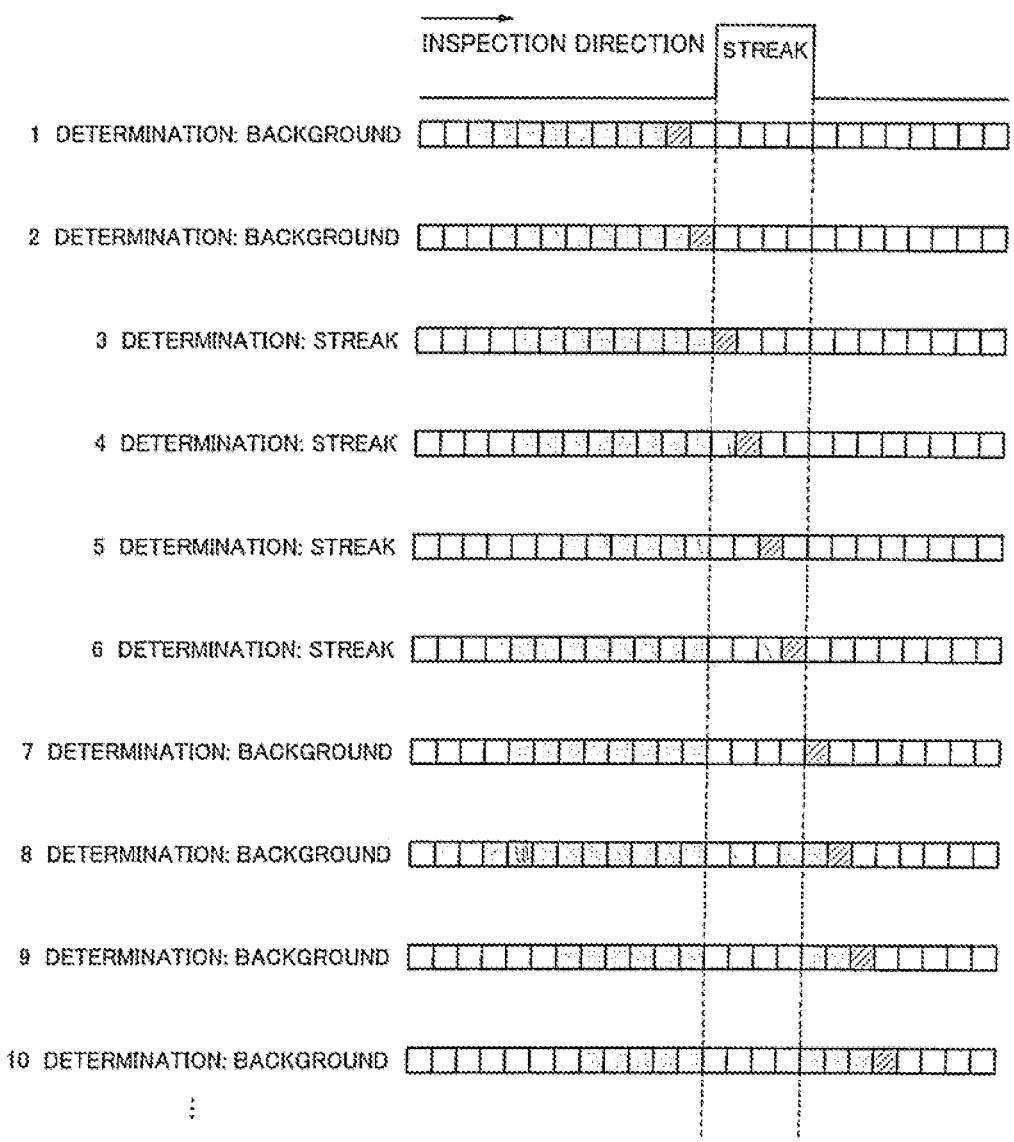
FIG. 10 is an explanation drawing showing an example of update of pixels whose number is a target pixel comparison pixel number used for BASE value calculation.

When the streak detection processing unit 202 determines that a target pixel is included in a streak as shown in FIG. 10, at the time of determination for the next target pixel the streak detection processing unit 202 does not update the BASE value and uses the BASE value used in the last determination. The streak detection processing unit 202 does not update the BASE value while the streak detection processing unit 202 successively determines that a target pixel is included in a streak for a plurality of target pixels. After that, when it is determined that a target pixel is not included in a streak, the streak detection processing unit 202 updates the BASE value at the time of streak determination for the next target pixel. Specifically shown in FIG. 10, in this calculation, the streak detection processing unit 202 calculates an average value from weighted average values of the pixel, which is determined to be not included in a streak in the last determination, adjacent to the current target pixel and located at a backward side of the current target pixel in the inspection direction, and the pixels used in last calculation of the BASE value except the end of the series in the inspection direction of these used pixels, number of which is the specified number, which are the pixels detected to be not included in a streak, and the data of which are held by the streak detection processing unit 202. The streak detection processing unit 202 takes the calculated average value as the new BASE value, and compares the new BASE value with the weighted average value of the current target pixel.

As shown in FIG. 10, the streak detection processing unit 202 calculates BASE values using weighted average values of the specified number of pixels which are recently determined to be not included in a streak, without using weighted average values of pixels which are determined to be included in a streak.

The streak detection process of step S404 will be described with reference to FIG. 11.

Figure 11:
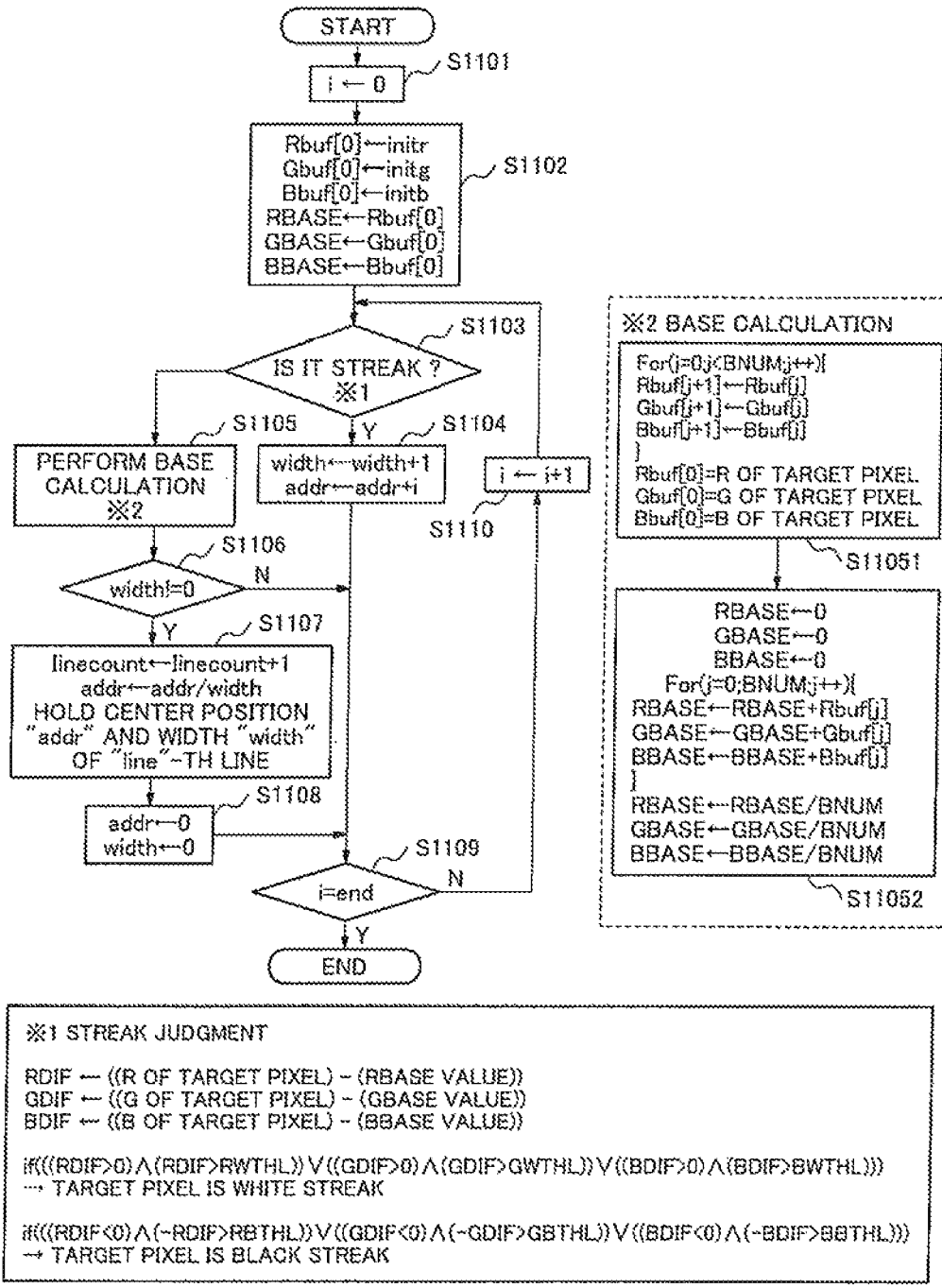
FIG. 11 is a flowchart showing operation of a streak detection process of step S404.

FIG. 11 is a flowchart showing operation of the streak detection process of step S404.

In FIG. 11, i is a variable which represents a count of main scanning pixels for which streak detection is done. The streak detection processing unit 202 assigns 0 to i at the start of the processing (step S1101).

The streak detection processing unit 202 respectively assigns "initr" which is a value for R, "inite" which is a value for G, and "initb" which is a value for B, as the BASE values used for steak detection of the target pixel at the start of processing, to Rbuf[0], Gbuf[0], and Bbuf[0], which are the first elements of arrays Rbuf, Gbuf, and Bbuf. The arrays Rbuf, Gbuf, and Bbuf are arrays for respective colors that hold respective color components of weighted average values of pixels used for the calculation of BASE values. The streak detection processing unit 202 assigns the values stored in Rbuf[0], Gbuf[0], and Bbuf[0] to the initial BASE values for the respective colors (step S1102). Before starting processing, a value "0" is assigned to all the elements of the Rbuf, the Gbuf, and the Bbuf, which are arrays for the respective colors. The value "initr", the value "initg", and the value "initb" can be set by a user of the image processing device 200 or the like.

When the condition with respect to ether the formula (7) or the formula (8) is satisfied with respect to each color component of weighted average value of a target pixel and BASE value of each color, the streak detection processing unit 202 determines that the target pixel is included in a streak, and the process proceeds to step S1104 (Yes in step S1103). When the condition with respect to the formula (7) and the condition with respect to the formula (8) are not satisfied, the streak detection processing unit 202 determines that the target pixel is not included in a streak, and the process proceeds to step S1105 (No in step S1103). When the result of the streak judgment of step S1103 is "Yes", the streak detection processing unit 202 increments a variable "width" which counts a width of a streak by 1 and a variable "addr" which a variable for representing a position of a streak by i, and the process proceeds to step S1109 (step S1104). Before starting the process, "0" is assigned to both of the variable "width" and the variable "addr" as an initial value.

When the result of the streak judgment of step S1103 is "No", the streak detection processing unit 202 calculates a BASE value of each color (step S1105).

A process of step S1105 will be described in detail with reference to note (*2) shown in FIG. 11.

The streak detection processing unit 202 reassigns, for each array of Rbuf, Gbuf, and Bbuf, the values that are assigned to the elements indicated by the index from 0 to BNUM−1 to the elements indicated by the number which is the index plus 1, respectively. The BNUM is a constant value and represents the target pixel comparison pixel number. In each of the arrays, the value that was assigned to the element indicated by the number of BNUM−1 is not used. The streak detection processing unit 202 reassigns the every color components of the weighted average value of the current target pixel to the Rbuf[0], the Gbuf[0], and the Bbuf[0], which are the first elements of the arrays, respectively for each color (step S11051).

For every colors, the streak detection processing unit 202 calculates BASE values that are average values of the values stored in the elements of the respective arrays, which are the arrays Rbuf, Gbuf, and Bbuf each element of which is reassigned in step S11051 (step S11052). When i is less than the BNUM, the streak detection processing unit 202 calculates BASE values from components indicated by the index from 0 to i of the arrays Rbuf, Gbuf, and Bbuf.

After completion of step S1105, when "0" has been assigned to the variable "width" which counts the width of the streak (No in step S1106), the process of the streak detection processing unit 202 proceeds a process of step S1109. When a value other than "0" is assigned to the variable "width" (Yes in step S1106), the streak detection processing unit 202 increments a variable "linecount" which is for counting the number of the detected streaks. And, the streak detection processing unit 202 updates the variable "addr" by assigning a value "addr/width" to the variable "addr". The result of calculation of the value "addr/width" represents a position of the center pixel of the streak in which the preceding target pixel is determined to be included. The streak detection processing unit 202 holds the value "width" which is a width of a streak and the value "addr" which is a position of a center pixel of a streak as streak information corresponding to the value assigned to the variable "linecount" (step S1107).

The streak detection processing unit 202 assigns "0" to the variable "width" and the variable "addr" (step S1108).

When the value of the variable "i" is not the value "end" that is the pixel number which corresponds to the end of the inspection region (No in step S1109), the streak detection processing unit 202 increments the variable "i" and the process proceeds to step S1103 (step S1110). When the value of the variable "i" is the value "end" (Yes in step S1109), the streak detection processing unit 202 judges the inspection to be done to the last pixel of the inspection region and ends the streak detection process.

Figure 12:
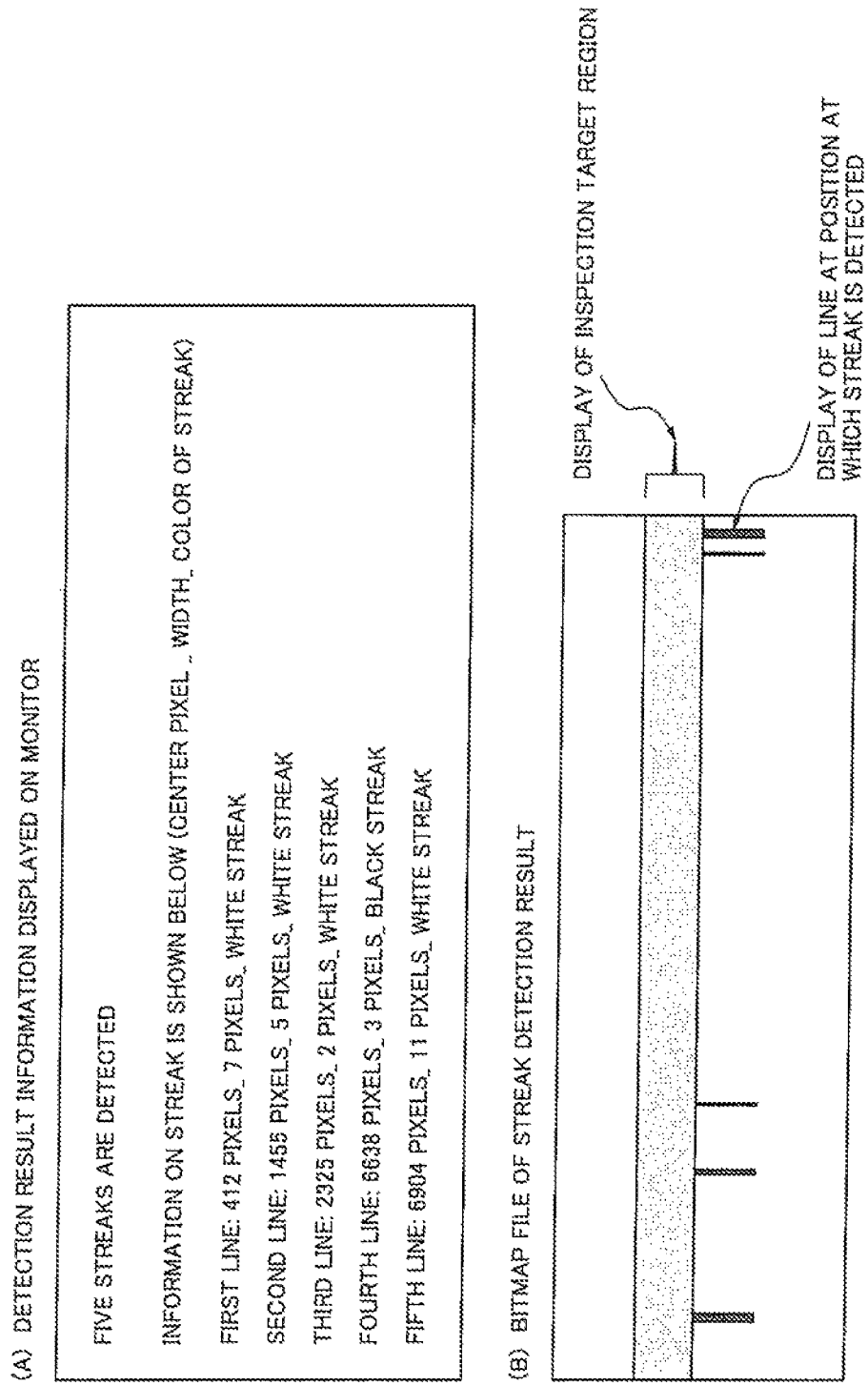
FIG. 12 is an explanation drawing showing an example of a display of a streak detection result and a bitmap file.

When the streak detection process of step S404 ends, as shown in FIG. 12 (a), the streak detection processing unit 202 outputs the value of the variable "linecount" calculated in the process of S404 and the streak information corresponding to the variable "linecount" on the monitor 210 as detection result information. As shown in FIG. 12(b), the streak detection processing unit 202 creates a bitmap file in which a line is displayed at a position where a streak is detected so that a operator can recognize the position of the detected streak at a glance, and ends all the processes (step S405). A representation format of information displayed on the monitor 210 and a representation format of information represented in the bitmap file is not limited to the format shown in FIG. 12.

As described above, this exemplary embodiment includes the following effects.

The first effect is that detection level of a streak can be set with respect to the difference between pixel values of pixels included in the streak and the pixel values of pixels not included in the streak and the width of the streak. In other words, the larger the difference is and the wider width of a streak is, the higher the detection level becomes, and, on the contrary, the smaller the difference is and the narrower width of a streak is, the lower the detection level becomes. The reason for this is that, in step S403, the streak detection processing unit 202 detects a streak using the average value of the pixels included in the range the center of which is the target pixel and the width of which is the specified width. Therefore, it is possible to obtain a result of streak detection from data, where the result is consistent with a streak which is visually observed in the output image of the data.

The first effect will be described in detail with reference to FIG. 13.

Figure 13:
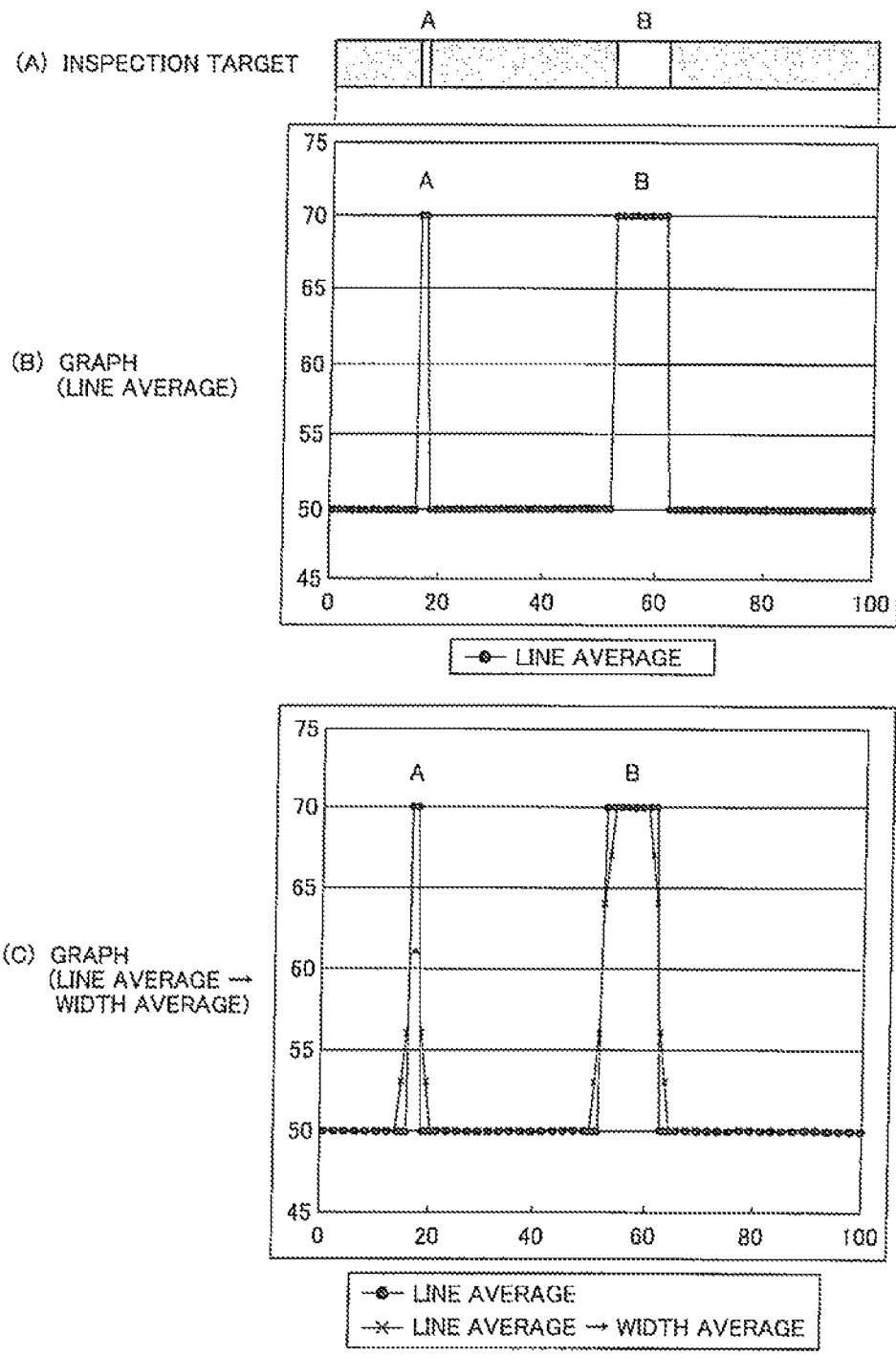
FIG. 13 is an explanation drawing showing an example of a graph of an average value data in a case in which a width average calculation of step S403 is performed and a case in which it is not performed.

FIG. 13 is an explanation drawing showing an example of a graph of an average value data with the weighted average calculation (hereafter in this exemplary embodiment and in FIG. 13, also referred to as width average calculation) of step S403 and an example of a graph of an average value data without width average calculation. As shown in FIG. 13(a), two streak candidates A and B appear in the inspection target. In this example, the pixel values of pixels included in the streak candidate A and the streak candidate B is the same. The difference between the pixel value of the streak candidate A and the pixel value of the area surrounding the streak candidate A is equal to the difference between the pixel value of the streak candidate B and the pixel value of the area surrounding the streak candidate B. It is assumed that the streak candidate B can be visually observed in the output image but the streak candidate A cannot be visually observed in the output image because the width of the streak candidate A is very narrow compared with the width of the streak candidate B. Therefore, in order to obtain a consistent result of streak detection from data with a streak visually observed in the output image of the data, the result of streak detection should be "the streak candidate A is not detected and the streak candidate B is detected". The graph (b) shows pixel values of every main scanning pixel after the line average calculation of step 402 is performed to the data of the inspection target (a). According to the detecting method based on a threshold and the difference between data of a target pixel and data of other pixels, when a streak is detected from the data of the graph (b), the streak candidates A and the streak candidates B are detected as streaks. But, by performing the width average calculation of step S403 to the line average value of the graph (b), data represented by a graph shown in graph (c) is obtained. When a streak is detected from the data represented by the graph (c), the detection result in which "the streak candidate A is not detected and the streak candidate B is detected" can be obtained.

The second effect is that the detection level can be finely changed not by changing the threshold, while maintaining the accuracy of streak detection. The reason for this is that when the streak detection processing unit 202 calculates the average value of the pixels included in the range the center of which is the target pixel and the width of which is the specified width in step S403, the streak detection processing unit 202 does not calculate a simple average but calculates a weighted average using a weighting coefficient to the target pixel.

The second effect will be described in detail with reference to FIG. 14.

Figure 14:
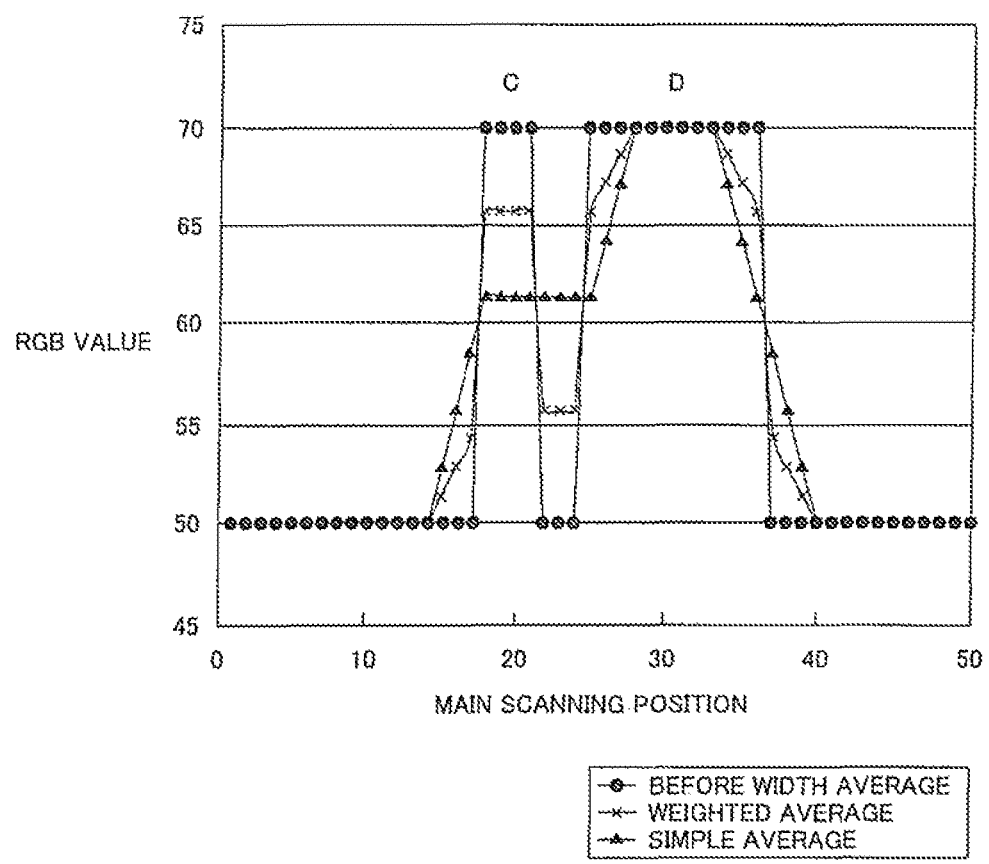
FIG. 14 is an explanation drawing showing an example of a graph of average value data of an inspection target in which two streak candidates C and D appear.

FIG. 14 is an explanation drawing showing an example of a graph of average value data of an inspection target in which two streak candidates C and D appear. It is assumed that the streak candidate C and the streak candidate D can be visually observed in the output image in which the streak candidate C and the streak candidate D appear. Accordingly, the result of the streak detection should be "the streak candidates C and D are detected". As shown in FIG. 14, when simple average is calculated in stead of the weighted average in the width average calculation of step S403, there is a possibility that the streak candidate C and the streak candidate D are detected as one streak which the streak candidate C and the streak candidate D combine with each other to become. Further, by simple average calculation, hem portion of a streak spreads and there is a possibility that a streak detected as a wider streak than the streak actually is. In contrast, when the weighted average is calculated in the width average calculation of step S403, the detection result that is "the streak candidates C and D are detected" is probably obtained because it is able to suppress combining of the streak candidates C and D and spreading of the hem portion.

Third effect is that only the pixels which are included in a streak are accurately detected. The reason for this is that in the streak detection process of step S404, the streak detection processing unit 202 excludes a pixel which is determined to be included in a streak from the pixels, which is located at the backward side of a target pixel and whose number is BNUM, used for the comparison with the target pixel.

Additionally, the streak detection processing unit 202 performs streak detection based on the average value of line average values of pixels whose number is the specified width. Therefore, the detection result is not easily affected by random noise.

Exemplary Embodiment 2

Next, a second exemplary embodiment of the present invention will be described with reference to the drawing.

Configuration of the second exemplary embodiment is the same as that of the first exemplary embodiment. Therefore, the explanation will be omitted.

Next, the operation of the exemplary embodiment will be described.

Figure 15:
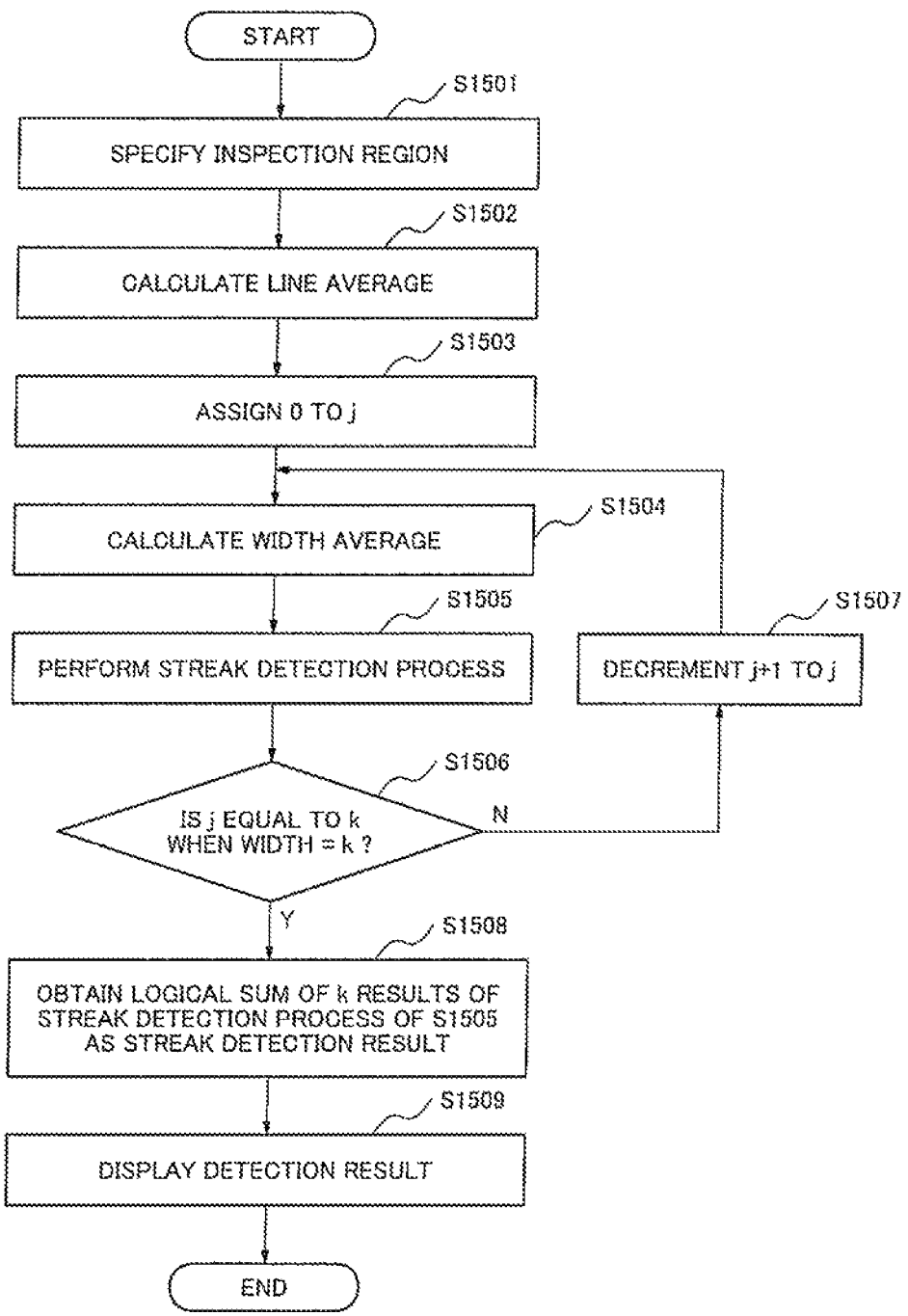
FIG. 15 is a flowchart showing operation of a streak detection process by a streak detection processing unit 202 in a second exemplary embodiment.

The streak detection processing unit 202 performs a process according to a flowchart shown in FIG. 15. FIG. 15 is a flowchart showing the operation of the streak detection process of the streak detection processing unit 202 in the second exemplary embodiment. The explanation of the process of step S1501 and step S1502 will be omitted because the process of step S1501 and step S1502 is the same as the process of step S401 and step S402, respectively.

At the start of streak detection process the streak detection processing unit 202 assigns 0 to a variable j which represents a starting position of an averaging process (step S1503).

Figure 16:
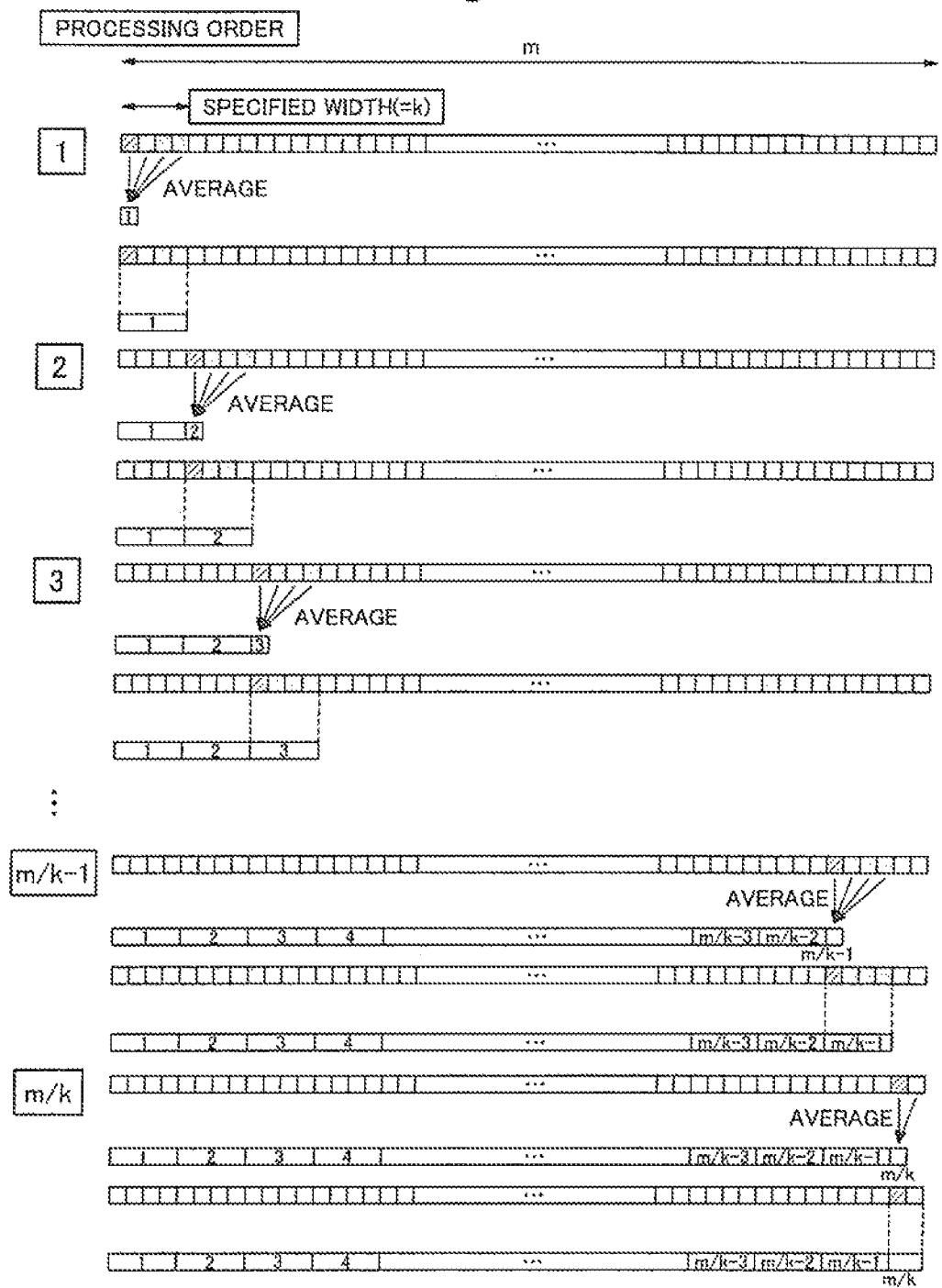
FIG. 16 is an explanation drawing showing an example of a width average process in a second exemplary embodiment.

As shown in FIG. 16, the streak detection processing unit 202 takes a pixel with an offset j from a first pixel of the line average value data as a target pixel, and calculates the average value (hereafter in this exemplary embodiment, referred to as a width average value) of the line average values, which are corresponding to the target pixel and the following pixels whose number, including the target pixel, is the specified width, for each color calculated in step S1502. Next, the streak detection processing unit 202 takes a pixel located at a distance of the specified width from the preceding target pixel in the main scanning direction as a new target pixel, and similarly calculates the average value of the line average values, which are corresponding to the target pixel and the following pixels whose number, including the target pixel, is the specified width. The streak detection processing unit 202 performs this process until all the line average values are processed (step S1504). As a result, as shown in FIG. 16, data of width average values, whose number is m/k, is obtained, where the number of pixels of the line average value data is m and the specified width is k. FIG. 16 shows an example of a process of which the offset j is 0.

The width average in this exemplary embodiment is a width average which is calculated without coefficients other than 1.

As shown in FIG. 9, for each color, the streak detection processing unit 202 takes one by one each of the pixels corresponding to the width average values whose number is m/k as a target pixel, and calculates the average values of the width average values, which is calculated in step S 1504, corresponding to the pixels, whose number is the target pixel comparison pixel number, located at a backward side of the target pixel in the inspection direction, and takes the calculated average values as the BASE values. The streak detection processing unit 202 calculates values RDIF, GDIF, and. BDIF which are differences between the target pixel and the BASE value of respective colors using the calculation formulas from the formula (4) to the formula (6) in the same way as the first exemplary embodiment. The streak detection processing unit 202 compares each of the RFIF, the GDIF, and the BDIF with the threshold value for white streak and the threshold value for black streak for corresponding color using the judgment formulas of the formula (7) and the formula (8), and determines whether or not the target pixel is included in a white streak and whether or not the target pixel is included in a black streak (step S1505).

Additionally, when the streak detection processing unit 202 calculates the

BASE value, the streak detection processing unit 202 exclude the pixels which is determined to be included in a streak from the pixels, which is located at the backward side of the target pixel and whose number is BUNM, to be compared with the target pixel, as shown in FIG. 10, in the same way as the first exemplary embodiment.

The streak detection process of step S1505 will be described with reference to FIG. 17.

Figure 17:
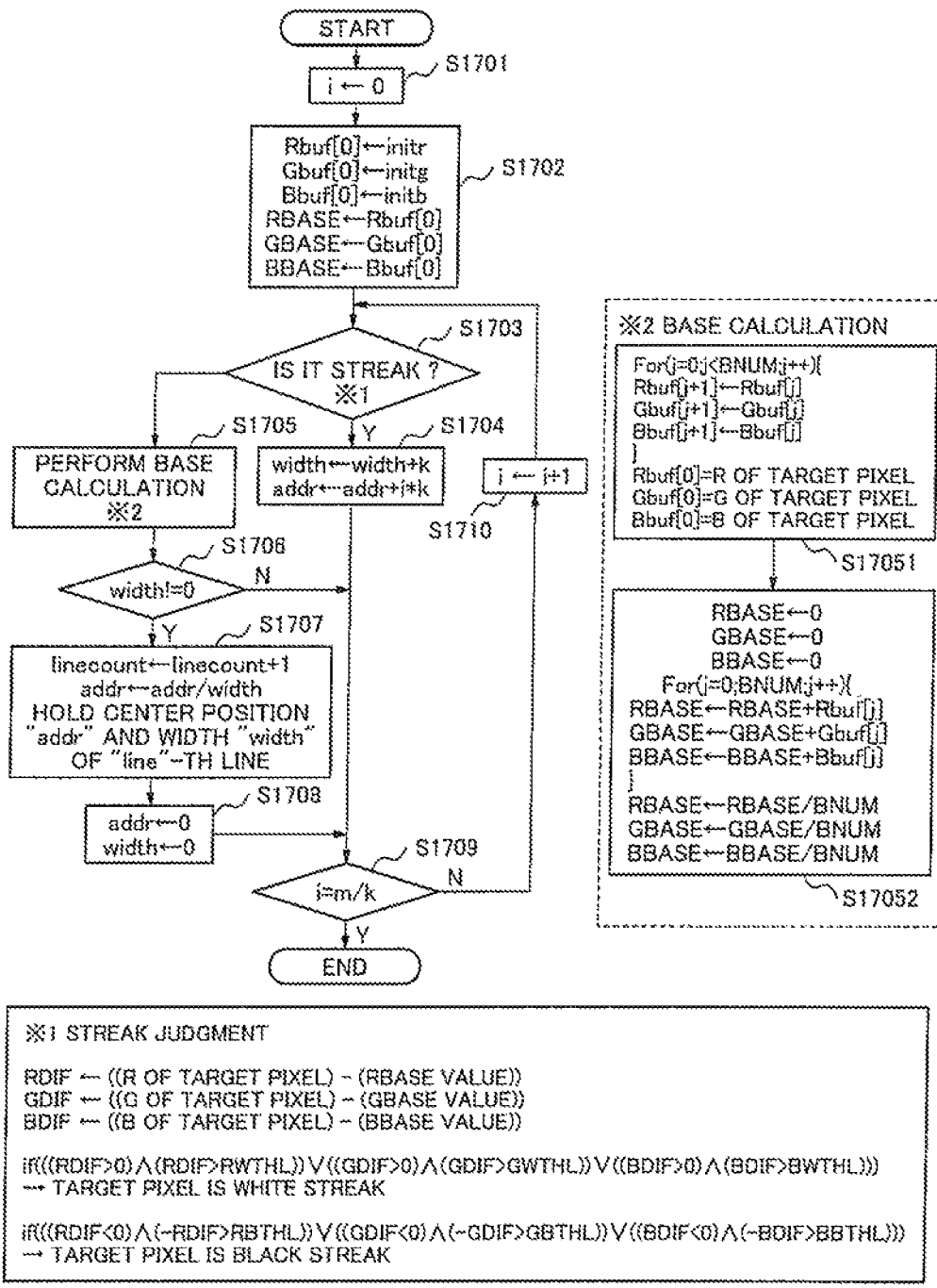
FIG. 17 is a flowchart showing operation of a streak detection process of step S1505.

FIG. 17 is a flowchart showing the operation of the streak detection process of step S1505.

Because the processes from step S1701 to S1710 excluding the processes of step S1704 and step S1709 are the same as the respective processes from step S1101 to step S1110 shown in FIG. 11, the explanations of the processes from step S1701 to S1710 excluding the processes of step S1704 and step S1709 will be omitted.

When the result of the streak judgment of step S1703 is "Yes", the streak detection processing unit 202 increments the variable "width", which is a count of the width of a streak, by k and the variable "addr", which represents the position of the streak, by i times k, and the process proceeds to step S1709 (step S1704). Before starting processing, "0" is assigned to the variable "width" and the variable "addr" as the initial value.

In step S1709, if the value of the variable i is not m/k (No in step S1709), the streak detection processing unit 202 increments the variable i, and the process proceeds to step S1703 (step S1710). If the value of the variable i is m/k (Yes in step S1709), the streak detection processing unit 202 judges that the inspection has been performed on all the data of the width average values, and ends the streak detection process.

When the streak detection process of step S1505 ends, the streak detection processing unit 202 confirms whether the value of the variable j is equal to the specified width k. If the value of the variable j is not equal to the specified width k (No in step S 1506), the streak detection processing unit 202 increments the variable j, and the process proceeds to step S1504 (step S1507). If the value of the variable j is equal to the specified width k (Yes in step S1506), the streak detection processing unit 202 takes the logical sum of the k detection results obtained in the process of step S1505 as the final result (step S1508).

The streak detection processing unit 202 performs the detection process k times and takes the logical sum of the k detection results as the final result. The reason for this will be described with reference to FIG. 18.

Figure 18:
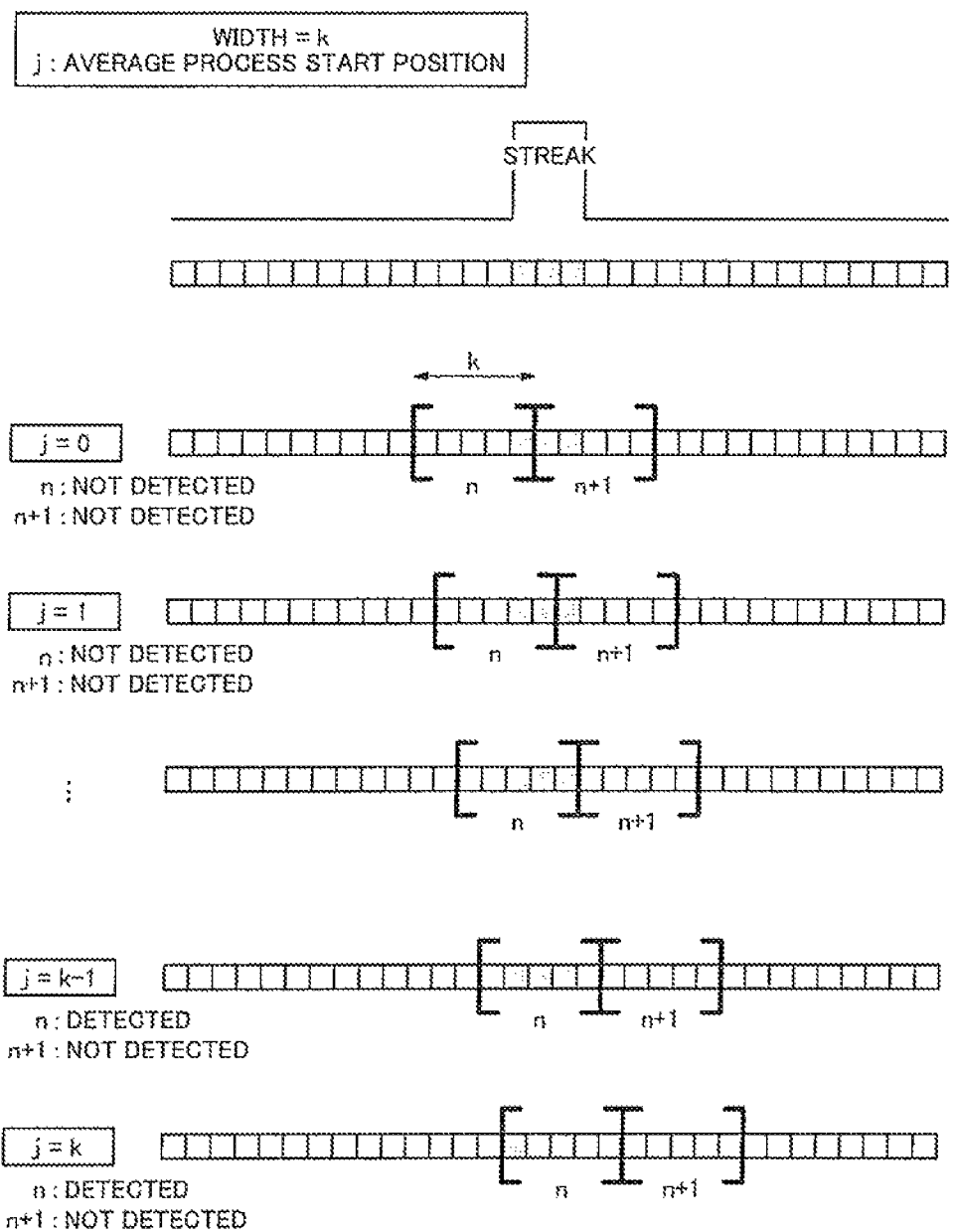
FIG. 18 is an explanation drawing showing an example of a streak detection result of a n-th width average value data and a (n+1)th width average value data when an offset j is changed.

FIG. 18 is an explanation drawing showing examples of results of streak detection from the n-th data of width average value and the (n+1)th data of width average value under varied offset j. For example, assuming that the requirement for a streak to be detected is that all the pixels that is included the steak are included in the k pixels which are averaged in the averaging process of step S1504, where k is the specified width, although this depends on the setting of the threshold values, the results of streak detection are as follows. In case of j=0 in which pixels including the first pixel are averaged at the start in the averaging process of step S1504, or in case of j=1 in which the averaging process of step S1504 starts averaging from the pixel located at a position shifted by one pixel from the position of the first pixel, the streak detection processing unit 202 does not detect the streak, as shown in FIG. 18. However, by calculating the logical sum of the every results of detection obtained in the averaging process of S1504 changing the starting position of the averaging one pixel at a time from the position of the first pixel to the position of the pixel located at the position shifted by k which is the specified width, the streak detection processing unit 202 detects the streak without fail.

As shown in FIG. 12(a), the streak detection processing unit 202 outputs the "linecount" which represents the number of streaks detected in step S1508 and streak information corresponding to the "linecount" to the monitor 210 as information of the result of detection, in the same way as the first exemplary embodiment. And, as shown in FIG. 12(b), the streak detection processing unit 202 creates a bitmap file representing a image in which a line is drawn at the position where a streak is detected so that a operator can recognize the position where the streak is detected at a glance, and all the processes end (step S1509).

As explained above, in this exemplary embodiment, in the same way as the first exemplary embodiment, it is possible to obtain a result of streak detection from data, where the result is consistent with a streak which is visually observed in the output image of the data, because the process of streak detection of this exemplary embodiment includes the line average calculation and the width average calculation and the difference between pixel values inside and outside of a streak and the width of a streak simultaneously considered. Further, by coordinating the specified width k, the detection level can be set according to the width of a streak to be detected.

Furthermore, because the detecting method of this exemplary embodiment is a simple method which needs no weighted averaging process, the processing load of streak detection on the image processing device 200 can be reduced.

Figure 19:
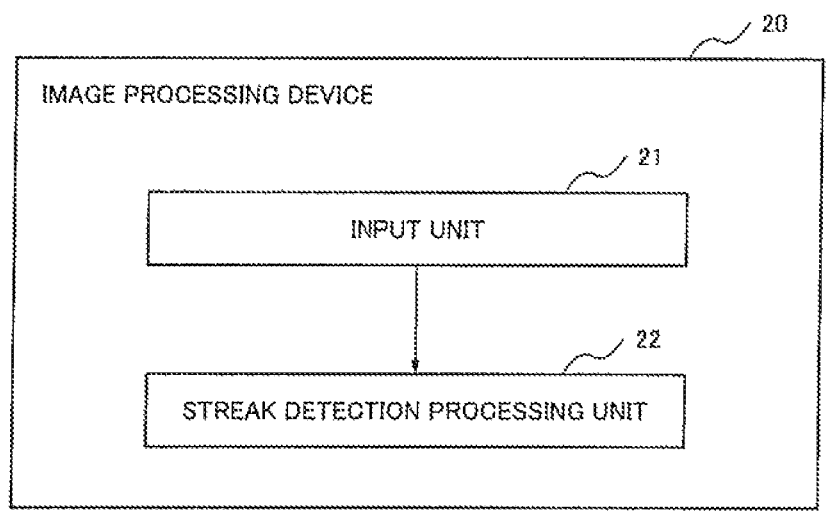
FIG. 19 is a block diagram showing a main part of an image processing device according to the present invention.

FIG. 19 is a block diagram showing a main part of an image processing device according to the present invention.

As shown in FIG. 19, an image processing device 20 (in the exemplary embodiment, it is realized by the image processing device 200) is characterized by comprising an input unit 21 (in the exemplary embodiment, it is realized by the image data reception unit 201) which inputs image data of a chart for inspection and a streak detection unit 22 (in the exemplary embodiment, it is realized by the streak detection processing unit 202) which specifies an inspection region in the image data inputted by the input unit 21, calculates a line average value which is an average value of all pixels on a line, which corresponds to a main scanning pixel, for each line in a sub-scanning direction in the inspection region, calculates a width average value which is an average value of the line averages of the lines corresponding to a series of main scanning pixels, the number of which is a specified width and whose center is a target pixel, for each target pixel which is a main scanning pixel selected sequentially in a inspection direction from the first main scanning pixel to the last main scanning pixel, calculates a difference between the width average value, and the average value of the line average values of the target pixel and a predetermined number of main scanning pixels which are the nearest to the target pixel located at a backward side of the target pixel with respect to the inspection direction, and determines that the target pixel is included in a streak when the difference exceeds the threshold value set in advance.

In the above-mentioned exemplary embodiment, the following image processing device is also disclosed.

(1) An image processing device in which the streak detection unit 22 calculates as the width average value a weighted average value from the line average values corresponding to the series of main scanning pixels using a weighting coefficient for the target pixel and another weighting coefficient for the main scanning pixels other than the target pixel.

(2) An image processing device in which when calculating the difference between the width average value, and the average value of the line averages of the target pixel and the predetermined number of main scanning pixels, the streak detection processing unit 22 uses the line averages of the predetermined number of main scanning pixels which are the nearest to the target pixel among main scanning pixels which are determined to be not included in a streak.

(3) An image processing device which is connected to an output device (in the exemplary embodiment, it is realized by the monitor 210) that can display detection result information and in which the streak detection unit 22 stores the detection result information which represents number of streaks that are detected, widths of the streaks, and positions of the streaks and outputs the detection result information to the output device.

(4) An image processing device in which the streak detection unit 22 calculates the difference for each color of R, G and B and compares it with the threshold value set in advance for each color of R, G, and B, respectively.

While the invention has been particularly shown and described with reference to exemplary embodiments thereof, the invention is not limited to these embodiments. It will be understood by those of ordinary skill in the art that various changes in form and details may be made therein without departing from the sprit and scope of the present invention as defined by the claims.

The invention claimed is:

1. An image processing device comprising:
   an input unit which inputs image data of a chart for inspection; and
   a streak detection processing unit which specifies an inspection region in the image data inputted by the input unit,
   calculates a line average value which is an average value of all pixels on a line, which corresponds to a main scanning pixel, for each line in a sub-scanning direction in the inspection region,
   calculates a width average value which is an average value of the line averages of the lines corresponding to a series of main scanning pixels, the number of which is a specified width and whose center is a target pixel, for each target pixel which is a main scanning pixel selected sequentially in a inspection direction from the first main scanning pixel to the last main scanning pixel,
   calculates a difference between the width average value, and the average value of the line average values of the target pixel and a predetermined number of main scanning pixels which are the nearest to the target pixel located at a backward side of the target pixel with respect to the inspection direction, and
   determines that the target pixel is included in a streak when the difference exceeds the threshold value set in advance.

2. The image processing device according to claim 1, wherein the streak detection processing unit calculates as the width average value a weighted average value from the line average values corresponding to the series of main scanning pixels using a weighting coefficient for the target pixel and another weighting coefficient for the main scanning pixels other than the target pixel.

3. The image processing device according to claim 1, wherein when calculating the difference between the width average value, and the average value of the line averages of the target pixel and the predetermined number of main scanning pixels, the streak detection processing unit uses the line averages of the predetermined number of main scanning pixels which are the nearest to the target pixel among main scanning pixels which are determined to be not included in a streak.

4. The image processing device according to claim 1 wherein
   an output device that displays detection result information, which includes information of a streak which is detected, is connected to the image processing device,
   the streak detection processing unit stores the detection result information and outputs the detection result information to the output device.

5. The image processing device according to claim 1, wherein
   the streak detection processing unit calculates the difference for ID each color of R, G and B and compares it with a threshold value set in advance for each color of R, G, and B, respectively.

6. An image processing method comprising:
   inputting image data of a chart for inspection;
   specifying an inspection region in the image data;
   calculating a line average value which is an average value of all pixels on a line, which corresponds to a main scanning pixel, for each line in a sub-scanning direction in the inspection region;
   calculating a width average value which is an average value of the line averages of the lines corresponding to a series of main scanning pixels, the number of which is a specified width and whose center is a target pixel, for each target pixel which is a main scanning pixel selected sequentially in a inspection direction from the first main scanning pixel to the last main scanning pixel;
   calculating a difference between the width average value, and the average value of the line average values of the target pixel and a predetermined number of main scanning pixels which are the nearest to the target pixel located at a backward side of the target pixel with respect to the inspection direction; and determining that the target pixel is included in a streak when the difference exceeds a threshold value set in advance.

7. A non-transitory computer readable medium embodying an image processing program which causes a computer to execute a process comprising:

inputting image data of a chart for inspection;

specifying an inspection region in the image data;

calculating a line average value which is an average value of all pixels on a line, which corresponds to a main scanning pixel, for each line in a sub-scanning direction in the inspection region;

calculating a width average value which is an average value of the line averages of the lines corresponding to a series of main scanning pixels, the number of which is a specified width and whose center is a target pixel, for each target pixel which is a main scanning pixel selected sequentially in a inspection direction from the first main scanning pixel to the last main scanning pixel, calculating a difference between the width average value, and the average value of the line average values of the target pixel and a predetermined number of main scanning pixels which are the nearest to the target pixel located at a backward side of the target pixel with respect to the inspection direction; and determining that the target pixel is included in a streak when the difference exceeds a threshold value set in advance.

* * * * *